(12) United States Patent
Agarwal

(10) Patent No.: US 10,303,384 B1
(45) Date of Patent: May 28, 2019

(54) TASK READINESS FOR QUEUED STORAGE TASKS

(71) Applicant: Western Digital Technologies, Inc., San Jose, CA (US)

(72) Inventor: Dinesh Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/824,046

(22) Filed: Nov. 28, 2017

(51) Int. Cl.
G06F 3/06 (2006.01)
G06F 9/50 (2006.01)

(52) U.S. Cl.
CPC .......... *G06F 3/0631* (2013.01); *G06F 3/0604* (2013.01); *G06F 3/0679* (2013.01); *G06F 9/50* (2013.01)

(58) Field of Classification Search
CPC ......... G06F 3/0631; G06F 3/0604; G06F 9/50
USPC ................................. 711/152, 154
See application file for complete search history.

(56) References Cited

U.S. PATENT DOCUMENTS

| | | | |
|---|---|---|---|
| 7,480,754 B2 | 1/2009 | Priborsky et al. | |
| 9,519,440 B2 | 12/2016 | Shacham et al. | |
| 9,563,250 B2 * | 2/2017 | Rychlik | G06F 1/3203 |
| 9,645,866 B2 * | 5/2017 | Bourd | G06F 9/546 |
| 2010/0037029 A1 * | 2/2010 | Scheuermann | G06F 9/52 711/154 |
| 2015/0199137 A1 | 7/2015 | Shin et al. | |
| 2015/0212738 A1 | 7/2015 | D'Eliseo et al. | |
| 2015/0271232 A1 * | 9/2015 | Luby | H04L 65/4084 709/231 |
| 2016/0006805 A1 * | 1/2016 | Ulupinar | H04L 67/02 709/217 |
| 2016/0291878 A1 | 10/2016 | Kang | |

* cited by examiner

*Primary Examiner* — Pierre Miche Bataille
(74) *Attorney, Agent, or Firm* — Vierra Magen Marcus LLP

(57) ABSTRACT

One or more control circuits of a storage system are configured to intelligently set a task readiness indicator for tasks on a task command queue. A memory controller may divide each of the tasks into one or more chunks. The memory controller initiates processing of at least some of the chunks for at least two tasks and determines a task readiness factor each of the tasks based on how far respective chunks have progressed in the processing. The memory controller sets a ready indicator in a task status register for a selected task based on the task readiness factor of the tasks. Therefore, task latency may be reduced. In one aspect, the memory controller allocates a ring buffer to chunks of an executing task. This ring buffer may assure that there will always be memory for the chunks of the task.

20 Claims, 12 Drawing Sheets

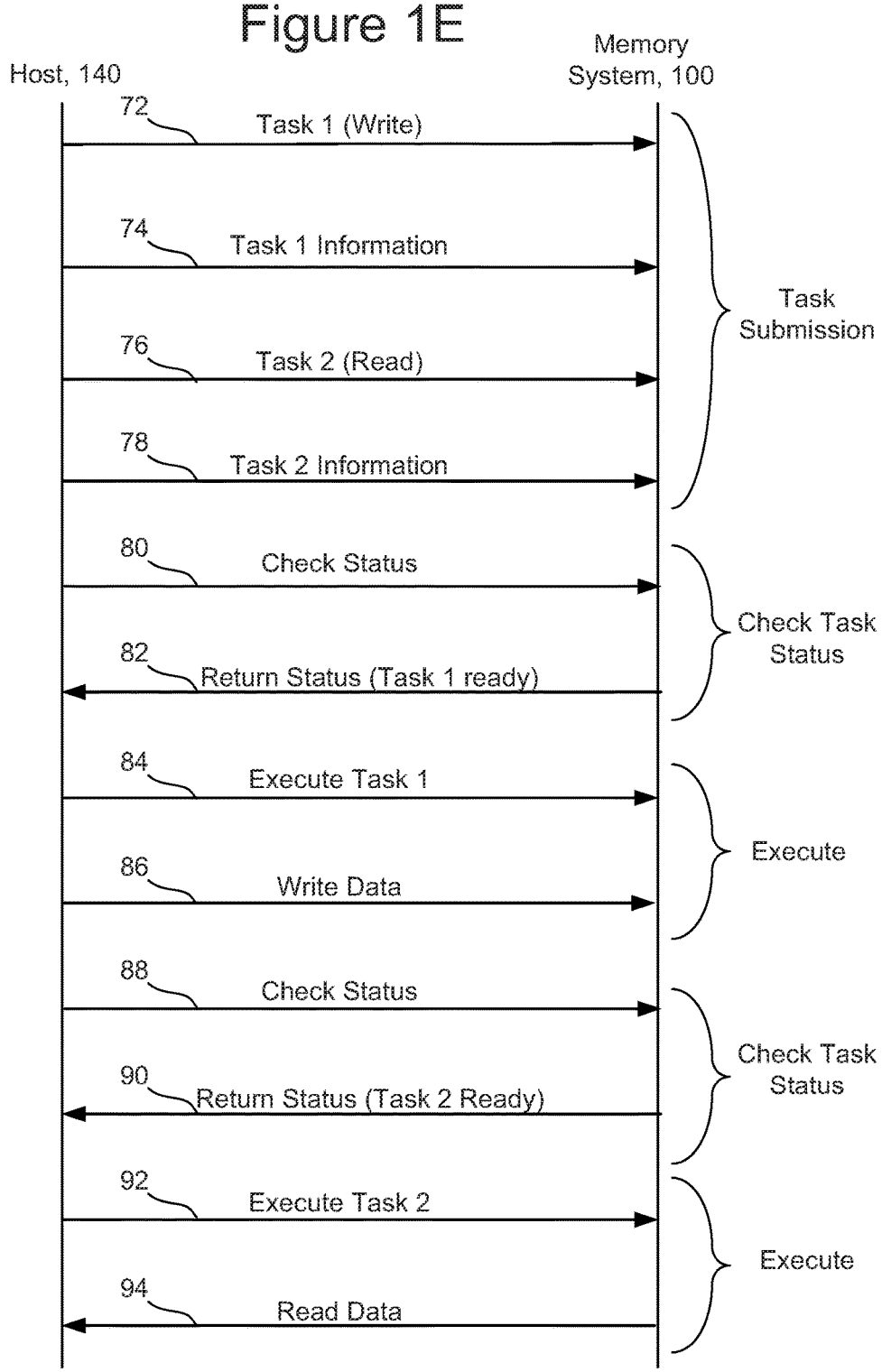

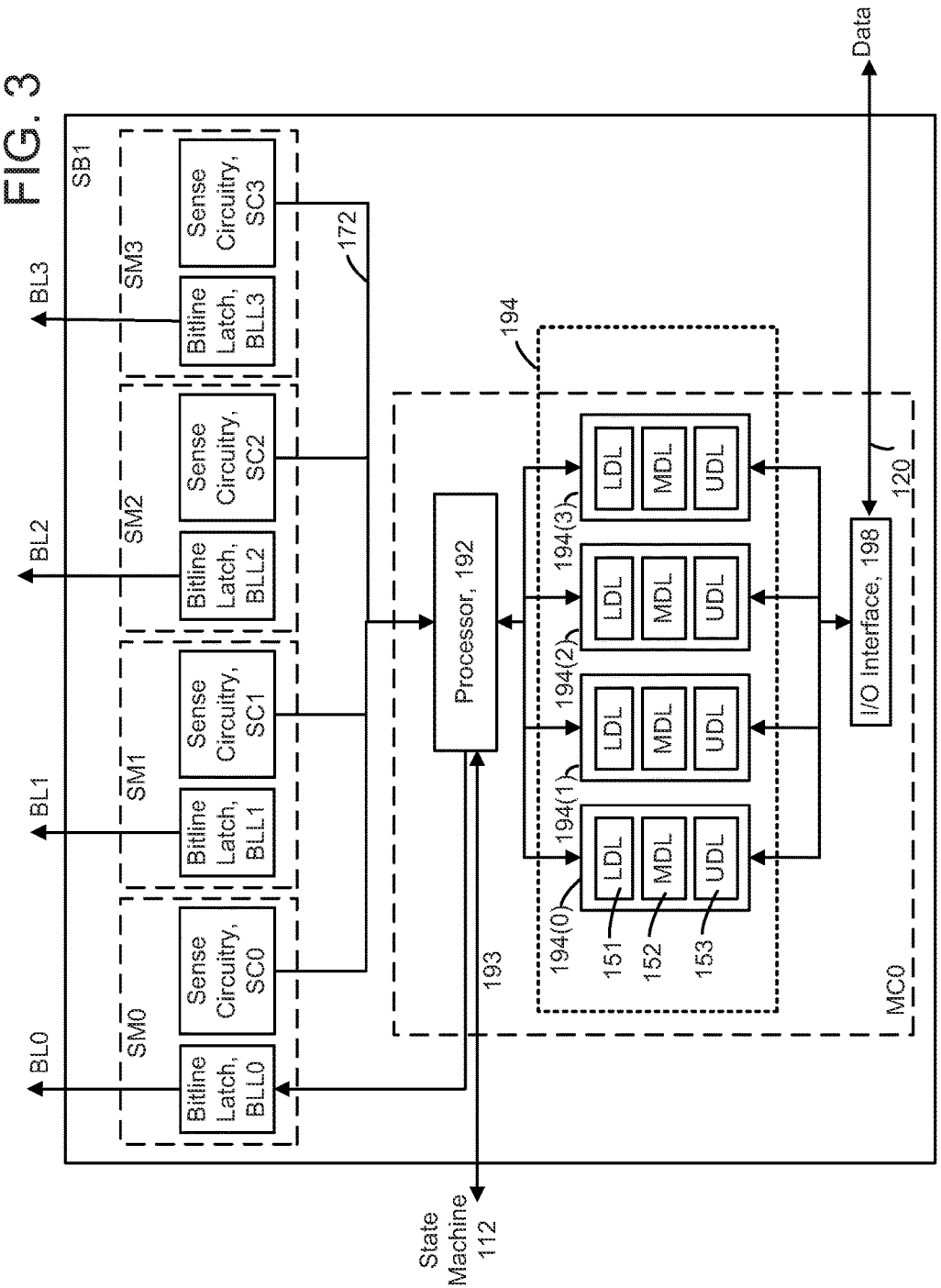

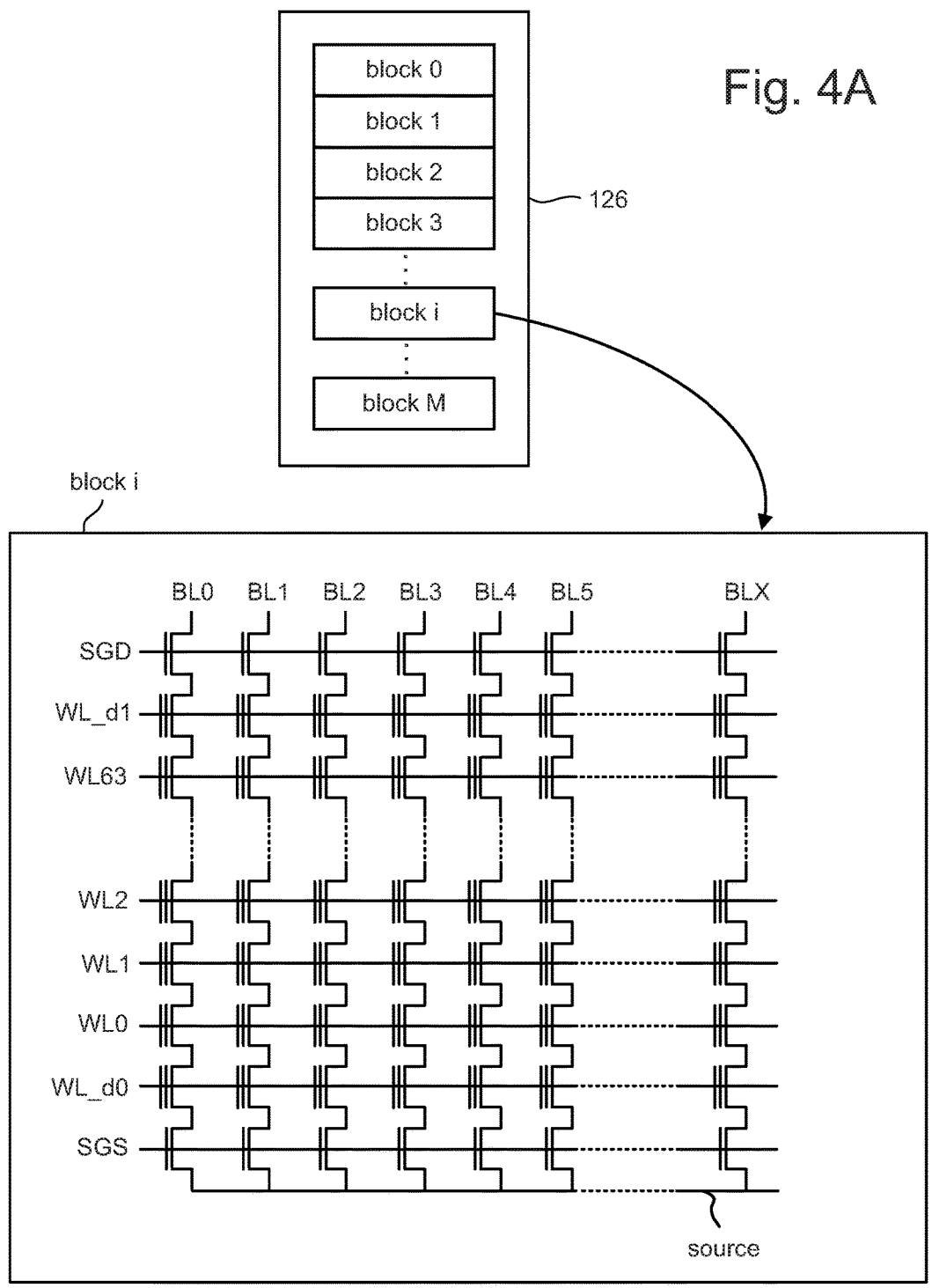

US 10,303,384 B1

TASK READINESS FOR QUEUED STORAGE TASKS

BACKGROUND

Memory systems typically have a controller that manages access to storage. Herein, this controller will be referred to as a "memory controller." The storage could have flash memory cells (e.g., NAND, NOR), resistive random access memory (ReRAM or RRAM), phase change memory (e.g., PCM), etc. The memory controller receives memory access commands (e.g., read write) from a host. The memory access commands typically indicate a starting logical address and a data length. The starting logical address could be a logical block address (LBA). The data length could be specified in a data unit, such as a block. The size of a block can vary from one implementation to the next. The memory controller translates the logical addresses to physical addresses in the storage. As one example, a flash memory device has a Flash Transfer Layer (FTL) or Media Management Layer (MML) that performs a logical address to physical address translation.

In some memory systems, the memory controller does not queue memory access commands from the host. Rather, the memory system receives a memory access command from the host, executes the memory access command, and sends a response to the host. Then, the host sends another command to be executed. For example, the memory system receives a read command, as well as logical address and data length, from the host. The memory system senses the data from the storage and provides that data to the host. Then, the host sends another read or write command.

In other memory systems, the memory controller maintains a command queue of memory access commands from a host. It is common to refer to the memory access requests from the host as "tasks." Hence, this command queue may be referred to herein to as either a "task command queue" or a "command queue." A task typically includes multiple commands from the host. For example, the host might send one command to indicate a read is requested, another command to provide the logical address and data length, and still another command to execute the read.

The memory controller indicates when a task on its command queue is ready to be executed. In the context of a read command "ready to execute" means that the memory controller will provide the data to the host within a specified time. In the context of a write command "ready to execute" means that the memory controller will program the data to storage within a specified time. The memory controller may maintain a task status register that indicates whether each task on the task queue is ready to be executed or not. To cause the memory controller to execute a task, the host first checks the status by, for example, sending a command to the memory controller to check the task status register. After the memory controller indicates a task is ready to execute, the host sends an execution command to the memory controller to instruct the memory controller to execute the task. Typically, the memory controller has a set amount of time to complete the task after the host sends an execution command. For example, the memory controller might have 100 milliseconds (ms) to provide the data for read command and 250 ms to program the data for a write command.

BRIEF DESCRIPTION OF THE DRAWINGS

FIG. 1E depicts one example of information flow between a host and a memory device when processing tasks.

FIG. 3 is a block diagram depicting one embodiment of the sense block SB1 of FIG. 2B.

FIG. 4A depicts an exemplary structure of memory cell array.

DETAILED DESCRIPTION

Figure 1A:
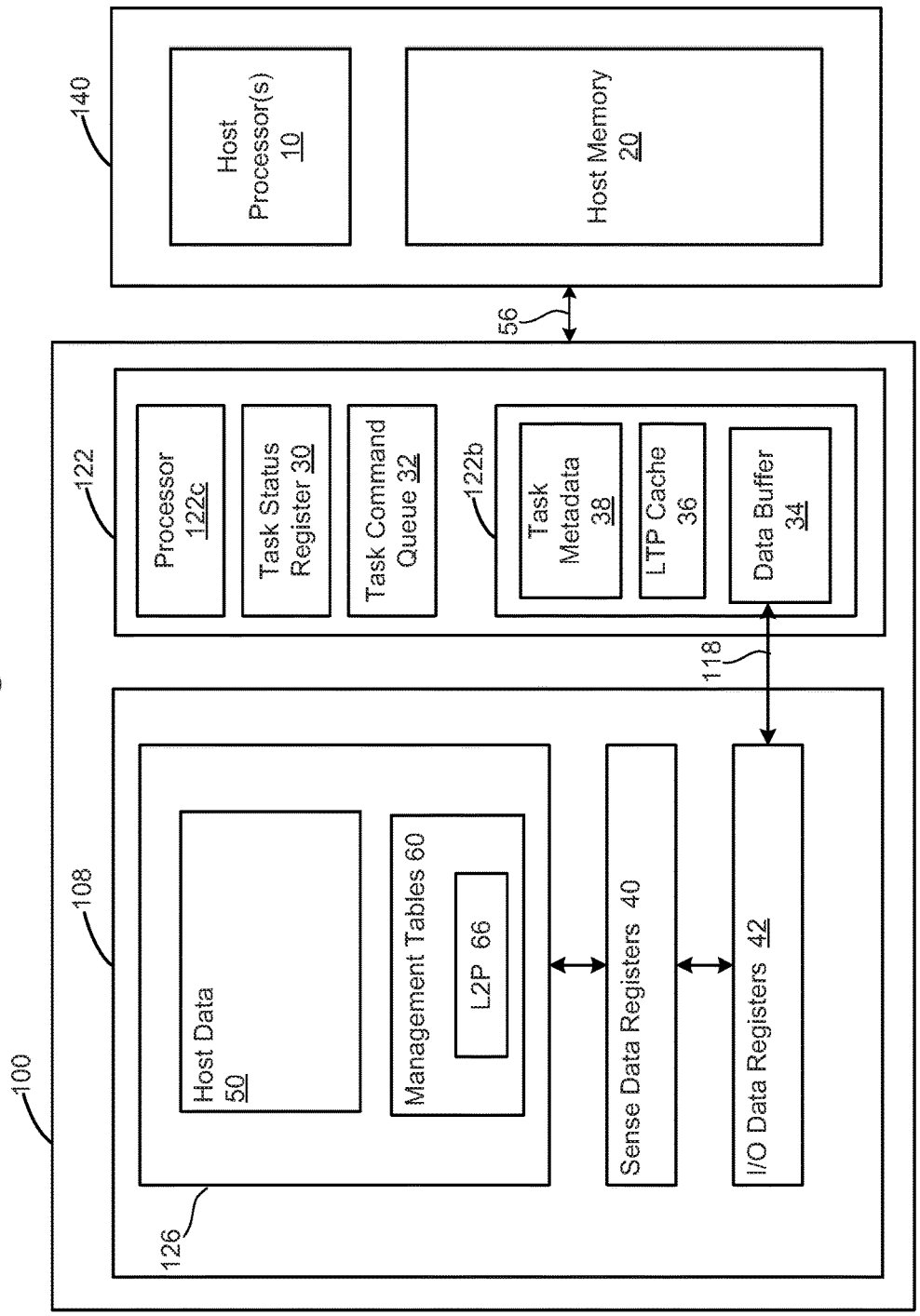
FIG. 1A is a block diagram depicting one embodiment of a storage device connected to a host device.

Storage devices, and methods for use therewith, are described herein. Such storage devices can include flash memory (non-volatile memory), random access memory (RAM), and a memory controller in communication with the flash memory and the RAM. In accordance with certain embodiments of the present technology, one or more control circuits of a storage system are configured to intelligently set a task readiness indicator for tasks on a task command queue. One embodiment of a memory controller divides each of the tasks into one or more chunks. Each chunk corresponds to a portion of the total data for the task. The memory controller initiates processing of at least some of the chunks and determines a task readiness factor each of the tasks based on how far respective chunks have progressed in the processing. The memory controller sets a ready indicator in a task status register for a selected task based on the task readiness factor of the tasks. Therefore, task latency may be reduced. In some embodiments, performance of random reads is improved.

Note that some specifications have a requirement that once a task is executing, the task needs to be completed and cannot be suspended to perform another task. One embodiment of the memory controller allocates a ring buffer to chunks of an already executing task. The ring buffer may be shared by different chunks of the task. The ring buffer may assure that there will always be memory for the chunks of the task. Thus, even if data is being fetched from non-volatile memory for other tasks, the ring buffer may assure that the executing task does not stall due to a lack of memory in data buffer. Therefore, task latency may be reduced.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a three digital reference number, and the first two digits of a four digit reference number, identifies the drawing in which the reference number first appears.

FIG. 1A is a block diagram depicting one embodiment of a storage system 100 connected to a host device 140 (or embedded in the host device 140) that can implement embodiments of the present technology described below. Referring to FIG. 1A, the host device 140 stores data into, and retrieves data from, the storage system 100 by issuing write and read commands. The storage system 100 may be embedded in the host device 140 or may exist in the form of a card, universal serial bus (USB) drive, or other removable drive, such as a solid state disk (SSD) that is removably connected to the host device 140 through a mechanical and electrical connector. The host device 140 may be any of a number of fixed or portable data generating devices, such as a personal computer, laptop computer, notepad computer, a smartphone, a digital still camera, a digital video camera, a personal digital assistant (PDA), a server, a set top box, or the like. More generally, the host device 140 can include host logic that performs the functions of a personal computer, laptop computer, notepad computer, a smartphone, a digital still camera, a digital video camera, PDA, server, set top box, etc. While not specifically shown, the host can include and/or be in communication with read only memory (ROM).

The host device 140, which can be referred to more succinctly as the host 140, may include one or more host processors 10. The host processors may run one or more application programs. The application programs, when data is to be stored on or retrieved from the storage system 100, may communicate through one or more operating system application programming interfaces (APIs) with a file system. The file system may be a software module executed on the processor(s) 10 and manages the files in the storage system 100. The file system manages clusters of data in logical address space. Common operations executed by a file system include operations to create, open, write (store) data, read (retrieve) data, seek a specific location in a file, move, copy, and delete files. The file system may be circuitry, software, or a combination of circuitry and software.

Communication channel 56 between the host 140 and the storage system 100 may be used to transfer commands, data, etc. The interface for communicating over the communication channel 56 may be any of a number of known interfaces, such as Secure Digital (SD), Multimedia Card (MMC), embedded Multimedia Card (eMMC), Universal Flash Storage (UFS), Universal Serial Bus (USB) storage device, Serial Advanced Technology Attachment (SATA) and Small Computer Systems Interface (SCSI) interfaces. The host 140 may maintain a logical address range for all logical block addresses (LBAs) that have been assigned by the host 140 to data. In addition to being used to refer to the communication channel between the host 140 and the storage system 100, the reference number 56 can also be used to refer to host interface signals that are communicated over the communication channel 56.

The host 140 uses the file system to address files stored within the storage system 100, which can involve writing data to and reading data from the non-volatile memory 126 of the storage system 100. Exemplary types of file systems that can be used by the host 140 include, but are not limited to, FAT32, exFAT, ext2/3, HFS+. The storage system 100 will typically be designed to work with different types of hosts, each of which may use a different type of file system.

The storage system 100 includes a memory controller 122 (which can also be referred to as the controller 122) in communication with one or more memory dies 108 via communication interface 118. Communication interface 118 may be any suitable interface, such as Open NAND Flash (ONFI) interface. The controller 122 has a processor 122c, volatile memory 122b, task status register 30 and a task command queue 32. Although the task status register 30 and a task command queue 32 are depicted as being separate from volatile memory 122b, in some embodiments, the task status register 30 and/or the task command queue 32 can be stored in the volatile memory 122b.

The task command queue 32 has a number of task command registers, in one embodiment. The task command queue 32 may be referred to more succinctly as a command queue. Note that a task may include the host 140 sending multiple commands to the memory system 100. The tasks may include tasks such as writing data to non-volatile memory 126, or reading data from non-volatile memory 126. In some embodiments, the controller 122 is able to select the order of processing and execution of the commands in the task command queue 32.

The tasks could be compliant with a number of protocols and/or specifications, including but not limited to, Secure Digital (SD), Multimedia Card (MMC), embedded Multimedia Card (eMMC), Universal Flash Storage (UFS), Universal Serial Bus (USB) storage device, Serial Advanced Technology Attachment (SATA) and Small Computer Systems Interface (SCSI).

The memory controller 122 is configured to decode commands received from the host 140 and to store decoded commands in task command queue 32, in one embodiment. The memory controller is configured to associate a unique task ID with each task, in one embodiment. The unique task ID may be provided by host 140. In one embodiment, each task includes one or more task queuing commands, and a task execution command. The task queuing command may include a task set command and a task address command. A task set command could identify the task as a write or as a read, for example. One example of a task set command is CMD44 in a version of the Secure Digital (SD) specification that supports command queuing. For example, Secure Digital (SD) Specification 6.0 supports command queuing. The Secure Digital (SD) Specification 6.0 (as well as other versions) is provided by the SD Card Association and the SD Group. A task address command could identify a start address (e.g. logical block address), as well as a length. One example of a task set address is CMD45 in a version of the Secure Digital (SD) specification that supports command queuing. Herein, when the term CMD44 or CMD45 is used, it will be understood that this is in reference to a version of the Secure Digital (SD) specification that supports command queuing, such as Secure Digital (SD) Specification 6.0. However, note that other specifications including but not limited to eMMC, SATA, and UFM may have similar task set command and/or task address commands.

The task status register 30 are used to store status of each of the tasks. The memory controller 122 determines which of the tasks should have its status set to "ready for execution" in accordance with embodiments disclosed herein. The memory controller 122 intelligently selects which task to set to "ready for execution," which reduces overall latency and increases performance, in accordance with embodiments disclosed herein. The memory controller 122 sets an indicator in the task status register 30 to indicate that a task is ready for execution. In one embodiment, the term "ready for execution" is compliant with a version of the Secure Digital (SD) specification that supports command queuing. However, the term "ready for execution" may be compliant with other memory specifications such as, but not limited to, eMMC, SATA, UFM.

In one embodiment, the host 140 sends a request to the memory system 100 to provide information which indicates which task is ready to execute. The memory controller 122 may respond by reading the task status register 30. In another embodiment, the host 140 is able to directly read the task status register 30.

Figures 1B, 1C, 1D:
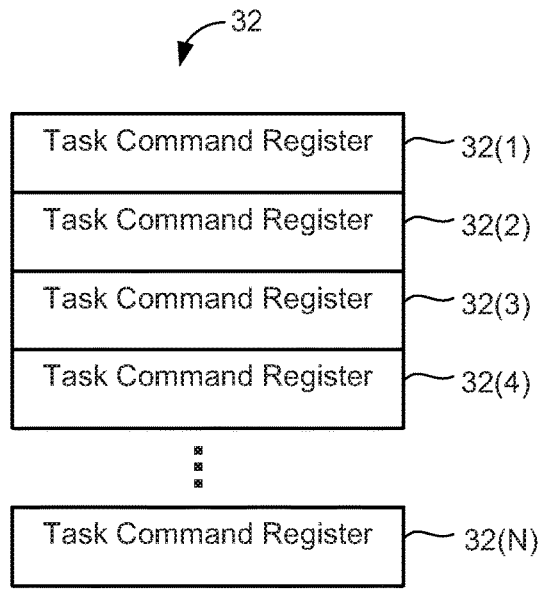
FIG. 1B depicts one embodiment of task command queue, which may be used in the controller 122 of FIG. 1A.
FIG. 1C depicts one embodiment of a task status register, which may be used in the controller 122 of FIG. 1A.
FIG. 1D depicts one embodiment of task metadata for one task.

A portion of memory 122b may be used to store task metadata 38. The task metadata 38 contains information about the processing of tasks in the memory system 100, in one embodiment. The information may be used by the memory controller 122 to determine a task readiness factor for a task. The task readiness factor for each task may be used to select a task to indicate as being ready to execute. Thus, the task readiness factor may be used to update the task status register 30. FIG. 1D shows further details of one embodiment of an entry of task metadata for one task.

A portion of the volatile memory 122b may be used for a data buffer 34, which may be used to store data from the host 140 to be programmed into memory 126. The data buffer 34 may also be used to store data read from memory 126 to be transfer to the host 140.

A portion of the volatile memory 122b may be used to store a cache of logical to physical mappings (L2P Cache 36). The controller 122 can use the logical to physical mappings to map logical block addresses in memory access commands from the host 140 to physical addresses of memory cells in the memory structure 126. For example, logical block addresses (LBAs) can be mapped to physical block addresses (PBAs). Such mappings can be used to directly map LBAs to the PBAs, or LBAs can be mapped to intermediate or virtual block addresses, which are mapped to PBAs.

The memory die 108 has a memory structure 126. Note that there may be one or more memory dies. The memory structure 126 is used to store host data 50. The memory structure 126 is also used to store management tables 60. The management tables may include L2P tables 66. Note that the LTP cache 36 is a cache of the L2P tables 66. Thus, if the memory controller 122 is processing a task and the LTP cache 36 does not contain a needed entry, the memory controller 122 may fetch one or more entries from the L2P table 66.

The memory die 108 has a set of sense data registers 40, which may be used to store data that was sensed from the memory cells. The sense data registers 40 may also be used to store data to be programmed into the memory cells. The sense data registers 40 are data latches, in one embodiment. The memory die 108 has a set of I/O registers 42, which may be used to store data from the memory controller 122 to be written to memory cells. The I/O registers 42 may also be used to store data read from memory cells to be transferred to the data buffer 34. The I/O registers 42 are data latches, in one embodiment.

When writing the memory structure 126, data may be transferred from host memory 20 to the data buffer 34. The memory controller 122 may transfer data from the data buffer 34 to the I/O data registers 42. The data from the I/O data registers 42 may then be transferred to the sense data registers 40. The data from the sense data registers 40 may then be programmed into memory cells in memory structure 126. Note that details such as adding parity bits to the host data are not described so as to simplify the explanation.

When reading the memory structure 126, data from the memory cells in memory structure 126 may be sensed and placed into the sense data registers 40. The data from the sense data registers 40 may then be transferred to the I/O data registers 42. The data in the I/O data registers 42 may then be transferred to the data buffer 34. The data in the data buffer 34 may then be transferred to host memory 20. Note that details such as performing error correction on the data read from memory structure 126 are not described so as to simplify the explanation.

FIG. 1B depicts one embodiment of task command queue 32, which may be used in the controller 122 of FIG. 1A. The task command queue 32 includes "n" separate task command registers 32(1)-32(n), each of which may store information for a different task from the host 140. The task command queue 32 may operate as an n-deep task queue, which could also be referred to as an "n-deep command queue."

Each task command register 32(1)-32(n) may store information for one task. For example, when a task set command (e.g., CMD44) is received, the memory controller 122 may decode the command and add information from decoding that command to one of the task registers. When a task address command (e.g., CMD45) for that same task is received, the memory controller 122 may decode that command and add information from decoding that command to the same task command register. Later, when a task execution command for that task is received from the host 140, the memory controller 122 may decode that command and add information from decoding the execution command to the task command register for that same task.

The memory controller 122 may store other information in the task command registers 32(1)-32(n), such as information regarding its processing of a given task. In one embodiment, the memory controller 122 sets a task to "pending" to indicate that the task was selected but the memory controller has not yet started to process that task. A task could be set to pending if the memory controller 122 is not yet able to perform a logical to physical address translation, because a control entry is not in the L2P cache 36. A task could be set to pending if there is not sufficient memory available in data buffer 34 to execute the task.

In one embodiment, the memory controller 122 sets a task to "processing" to indicate that the memory system 100 has begun to perform a memory access for at least one chunk of the task. For example, a read task could be set to "processing" in response to the memory controller 122 sending a command to a memory die 108 to sense a chunk of data for a task.

FIG. 1C depicts one embodiment of a task status register 30, which may be used in the controller 122 of FIG. 1A. The task status register 30 contains "n" entries, such that there may be an entry for each of the task registers 32(1)-32(n). Each entry is able to store a value for the status of one of the tasks. The status includes at least two states: 1) ready for execution, and 2) not yet ready for execution, in one embodiment. There may be other possible states, such as, error. The term "ready for execution" means that the task is ready in accordance with the Secure Digital (SD) Specification 6.0, in one embodiment. However, the term "ready for execution" is not limited to a version of the Secure Digital (SD) Specification. The term "ready for execution" is also intended to cover other memory access specifications that include command queuing, including but not limited to, eMMC, SATA, and UFM.

The memory controller 122 determines which of the tasks should have its status set to "ready for execution" in accordance with embodiments disclosed herein. The memory controller 122 intelligently selects which task to set to "ready for execution," which reduces overall latency and increases performance, in accordance with embodiments disclosed herein. In one embodiment, the memory controller 122 selects a task based on readiness of a chunks to transfer to the host.

FIG. 1D depicts one embodiment of task metadata 38 for one task. The task metadata 38 in FIG. 1A may contain one such entry for each task. The task ID indicates a unique task ID for this task. The task ID may be obtained from one of the task command registers 32(1)-32(n). When processing a task, the memory controller 122 may divide the task into a number of chunks. A chunk is some portion of the total data to be accessed for the task. In one embodiment, each chunk corresponds to a memory access command sent to the memory die. However, the definition of chunk size is flexible. In another embodiment, the chunk size might be capped at some unit of memory cells, such as one word line of memory cells. The chunks created indicates the current total number of chunks that the memory controller has created for this task. In one embodiment, the memory controller creates a chunk when it queues a memory command to send to a memory die. Further details of chunk creation are discussed with respect to FIG. 6. The task length refers to the total length of data to be accessed in the non-volatile memory 126, and may be obtained from the task command register 32(1)-32(n).

The processing state indicates how far along each chunk of the task is in processing. Note that the memory controller 122 may initiate memory operations for a task prior to the memory controller 122 setting the task status register to "ready to execute." For example, the memory controller may send a command to the memory die 108 to read a chunk of data. After the chunk is transferred from the memory die 108 to the memory controller 122, the memory controller 122 could perform additional processing such as error correction. The processing state indicates where a chunk is in processing. For example, the processing status could indicate one or more of: 1) whether the memory controller 122 has sent a command to the memory die to read a chunk; 2) whether the memory die has transferred the chunk to the memory controller; and/or 3) whether the memory controller has completed processing of the chunk (e.g., ECC) and the data for this chunk is in data buffer 34 ready to transfer to the host 140. These are just examples of the processing status-note that other possibilities exist.

The value for the processing status for each chunk is either 0 or 1, in one embodiment. As noted above, the processing status can be based on whether the chunk has completed some stage of processing. For the sake of example, the processing status may be set to "1" if the chunk has been transferred from the memory die 108 to the memory controller, and "0" if the chunk has not yet been transferred from the memory die 108 to the memory controller. Each chunk in the task is assigned its own value for the processing status, in one embodiment.

The task readiness factor is based on the processing status for all of the chunks in the task, in one embodiment. The following is one example of how the task readiness factor might be calculated. The task readiness factor weights the value of the processing status for each chunk. For example, the chunks in the task may be ordered, with the weight decreasing for chunks that are later in the order. The order of the chunks may be, for example, based on the order in which the memory controller initiated processing of the chunks, with chunks for which processing has not yet been initiated ranked in a random order. The total weight for all of the chunks in a task is 100%, in one embodiment. In one embodiment, if there is a single chunk in a task, that chunk receives a 100% weight. If there are multiple chunks in the task, then the first chunk receives a 50% weight and the remaining chunks together get 50% weight. For example, if there are two chunks, then the first chunk is weighted 50% and the second chunk is weighted 50%. If there are three chunks, then the first chunk is weighted 50%, the second chunk is weighted 25%, and the third chunk is weighted 25%. If there are four chunks, then the first chunk is weighted 50%, the second chunk is weighted 25%, the third chunk is weighted 12.5%, and the fourth chunk is weighted 12.5%. Thus, in one embodiment, the weight decreases for later chunks in the task, in one embodiment.

The task readiness factor is determined by multiplying the value for the processing status for each chunk by its weight, in one embodiment. Thus, if there are four chunks and the first chunk has a processing value of "1" and all other chunks have a processing value of "0," the task readiness factor is set to 0.5, in one embodiment. As another example, if there are four chunks and both the first chunk and second chunks have a processing value of "1" and all other chunks have a processing value of "0," the task readiness factor is set to 0.75, in one embodiment. As still another example, if there is a single chunk and its processing value is "1", then the task readiness factor is set to 1, in one embodiment. The foregoing examples are for purpose of illustration. Note that many variations are possible.

Note that one of the challenges in selecting a task to indicate as ready to execute is that for some specifications once a task begins to execute, that task must finish before another task may start execution. For example, once data transfer for a read starts, all of the data needs to be transferred to the host before data for another read task can be transferred to the host. Embodiments of a memory controller 122 intelligently select a task to indicate as ready to execute such that the task is able to complete without delays such as the data for the task not being ready to transfer to the host, or there not being sufficient memory in the data buffer 34 to allocate to the task. Moreover, embodiments of the memory controller 122 are able to initiate processing of other tasks while another task is executing. In one embodiment, the memory controller 122 allocates a ring buffer for chunks of a task to share, which may prevent the task from stalling due to lack of memory to store chunks read from the non-volatile memory 126.

FIG. 1E depicts one example of information flow between host 140 and memory system 100 when processing tasks. The flow depicts the host 140 submitting two tasks to the memory system 100, with the associated execution of the tasks. At step 72, the host 140 sends a task set command to the memory system 100. The task set command contains a task ID, in one embodiment. In this example, the task set command identifies this as a write task. The task set command may contain a priority. Optionally, the task set command could indicate a data length. The data length, if provided, may be expressed in a pre-defined unit, such as a sector or block. For example, a sector could be defined as 512 Bytes, and a block might be defined as 4 kilo-bytes (kB). The memory system 100 may send a response message to the host 140 acknowledging that it has received the task set command. The response message is not depicted in FIG. 1D, so as to not clutter the diagram. In one embodiment, the task set command is CMD44 in the Secure Digital (SD) 6.0 specification; however, the task set command is not limited to an SD specification. Note that in response to receiving the task set command, the memory system 100 may decode the task set command and add information to one of the task command registers 32(1)-32(n).

At step 74, the host 140 sends a task address command to the memory system 100. The task address command may include a start address, which indicate the start address of data corresponding to the current task. The start address may be logical address. The task address command may also include a data length, if that information is not included in the task set command. The task address command may also contain a task ID. One example of a task address command is CMD45 in the Secure Digital (SD) 6.0 specification; however, the task address command is not limited to an SD specification. Note that in response to receiving the task address command, the memory system 100 may decode the task address command and add information to the appropriate task register for the task with that ID.

At step 76, the host 140 sends a task set command for another task to the memory system 100. The task set command contains a task ID, in one embodiment. In this example, the task set command identifies this as a read task. The task set command may contain a priority. Optionally, the task set command could indicate a data length. In one embodiment, the task set command is CMD44 in the Secure Digital (SD) 6.0 specification; however, the task set command is not limited to an SD specification. Note that in response to receiving the task set command, the memory system 100 may decode the task set command and add information to one of the task command registers 32(1)-32(n).

At step 78, the host 140 sends a task address command to the memory system 100. This task address has the same task ID as the read task in step 76. The task address command may include a start address, which indicate the start address of data corresponding to the current task. One example of a task set address is CMD45 in the Secure Digital (SD) 6.0 specification; however, the task set address is not limited to an SD specification. Note that in response to receiving the task address command, the memory system 100 may decode the task address command and add information to the appropriate task register for the task with that ID.

In the foregoing example, the memory controller 122 has two tasks on its task command queue 32 at this point. Referring back to FIG. 1C, the task status register 30 has an entry for each task on the queue, in one embodiment. The memory controller 122 determines when to set the status for each task to "ready for execution." Note that the memory controller 122 may begin processing of the read task at this point, as it does not need any data from the host 140 to begin to access the data from non-volatile memory 126. Thus, the memory controller 122 does not need to receive the execute command from the host 140 to initiate memory access operations for the task.

At step 80, the host 140 checks the status of the tasks. The host may send a check status command to the memory device. In one embodiment, the host sends a CMD13 in the Secure Digital (SD) 6.0 specification; however, the check status command is not limited to an SD specification.

At step 82, the status is returned from the memory system 100 to the host 140. The memory device 140 may send a status response message. The status response message may include a status value for each task. In this example, the status indicates that Task 1 is ready to execute. The memory controller 122 may read the task status register 30 in order to form the status response message.

At step 84, the host 140 sends an execute command to the memory system 100, instructing the memory device 140 to execute Task 1. In one embodiment, the host sends a CMD46 in the Secure Digital (SD) 6.0 specification; however, the execute command is not limited to an SD specification.

At step 86, data for the write is transferred from the host memory 20 to the memory device volatile memory 122b. The write data may be placed into data buffer 34. Note that one of the conditions for the memory controller 122 to set the task ready status to ready for execution may be that the memory controller allocated a certain amount of space in the data buffer 34 for the write data. The memory controller 122 may consider other factors in setting the status to ready to execute. In response to receiving the data, the memory controller 122 instructs one or more memory die 108 to program the data. Upon completion of the programming, the memory controller 122 may send a response message to the host 140 indicating the success or failure of the programming operation.

At step 88, the host 140 again checks the status of the tasks. The host may send another check status command to the memory device. In one embodiment, the host sends a CMD13 in the Secure Digital (SD) 6.0 specification; however, the check status command is not limited to an SD specification.

At step 90, the status is returned from the memory system 100 to the host 140. The memory device 140 may send another status response message. In this example, the status indicates that Task 2 is ready to execute. The memory controller 122 may read the task status register 30 in order to form the status response message.

At step 92, the host 140 sends an execute command to the memory system 100, instructing the memory device 140 to execute Task 2. In one embodiment, the host sends a CMD46 in the Secure Digital (SD) 6.0 specification; however, the execute command is not limited to an SD specification. Note that by this point in time, the processing of the task could be in a variety of states. None, some, or all of the data for the task might be in data buffer 34. None, some, or all of the data for the task might have already been sensed from non-volatile memory 126. In one embodiment, at least some of the data for the task has already been sensed from non-volatile memory 126. Thus, note that the memory device 126 might still need to sense some of the data from non-volatile memory 126. Also, the memory controller 122 might still need to perform some processing on all or a portion of the data sensed from non-volatile memory 126, such as running an ECC algorithm. However, it is also possible by this time that all of the data for this task is already completely ready to transfer to the host 140.

At step 94, the data for Task 2 is transferred from the memory system 100 to the host. For example, the data is transferred from data buffer 34 to host memory 20.

Figure 2A:
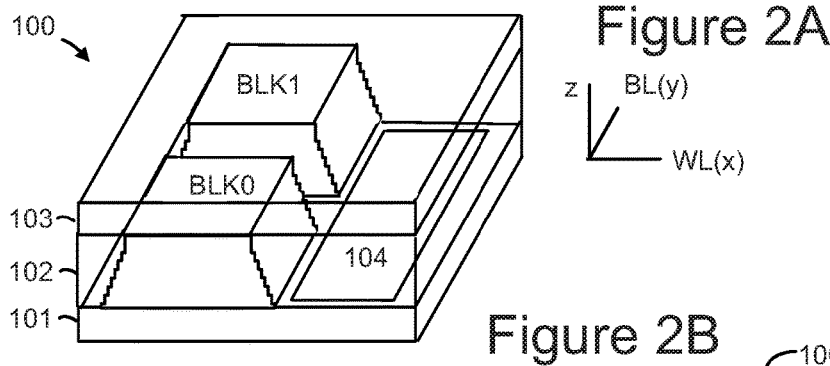
FIG. 2A is a perspective view of a three dimensional (3D) stacked non-volatile memory device.

FIGS. 2A-4 describe one example of a memory system 100 that can be used to implement the technology proposed herein. FIG. 2A is a perspective view of a three dimensional (3D) stacked non-volatile memory device. The memory system 100 includes a substrate 101. On and above the substrate are example blocks BLK0 and BLK1 of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2B:
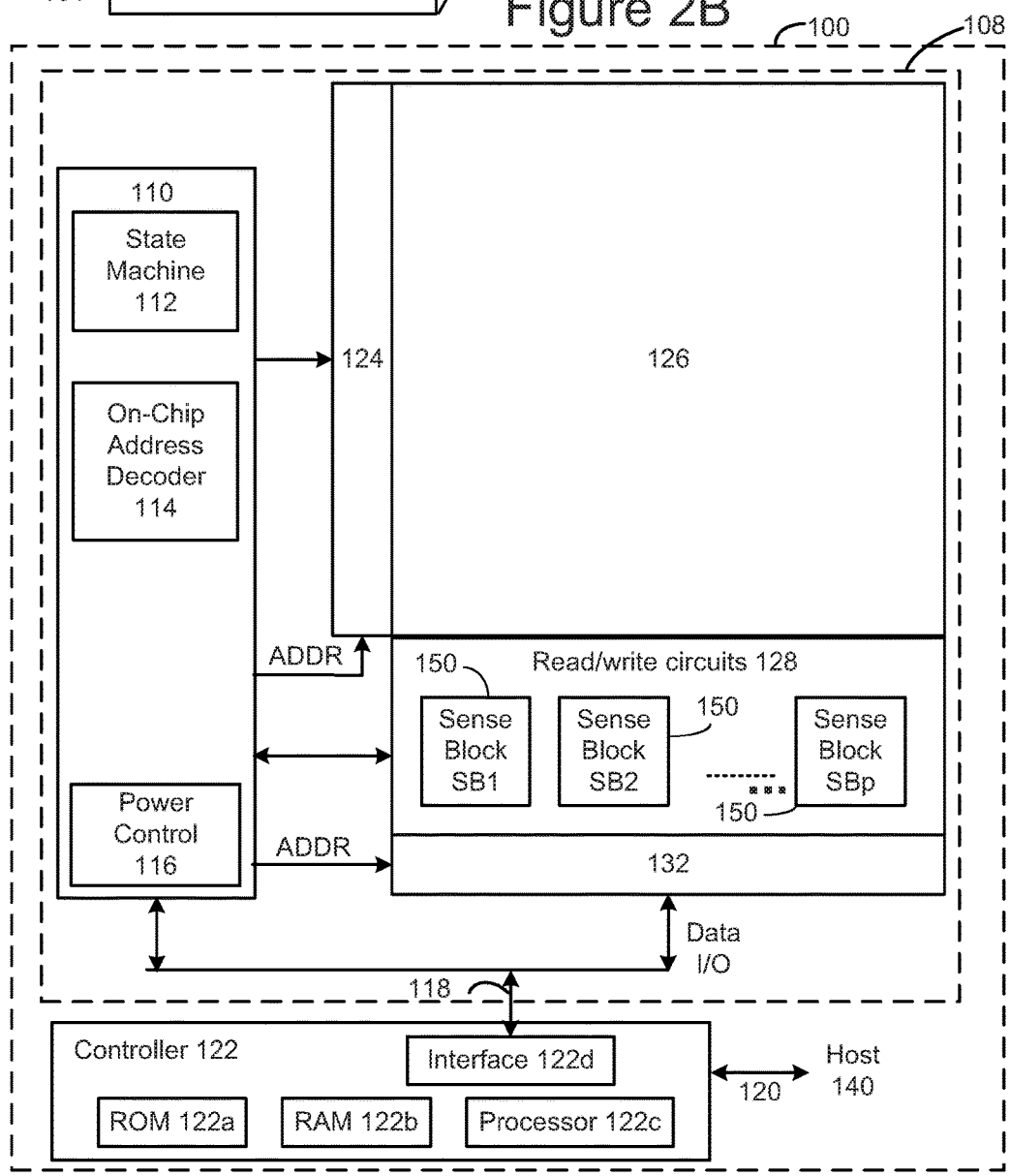
FIG. 2B is a functional block diagram of an example memory device such as the 3D stacked non-volatile memory device of FIG. 2A.
Figure 2C:
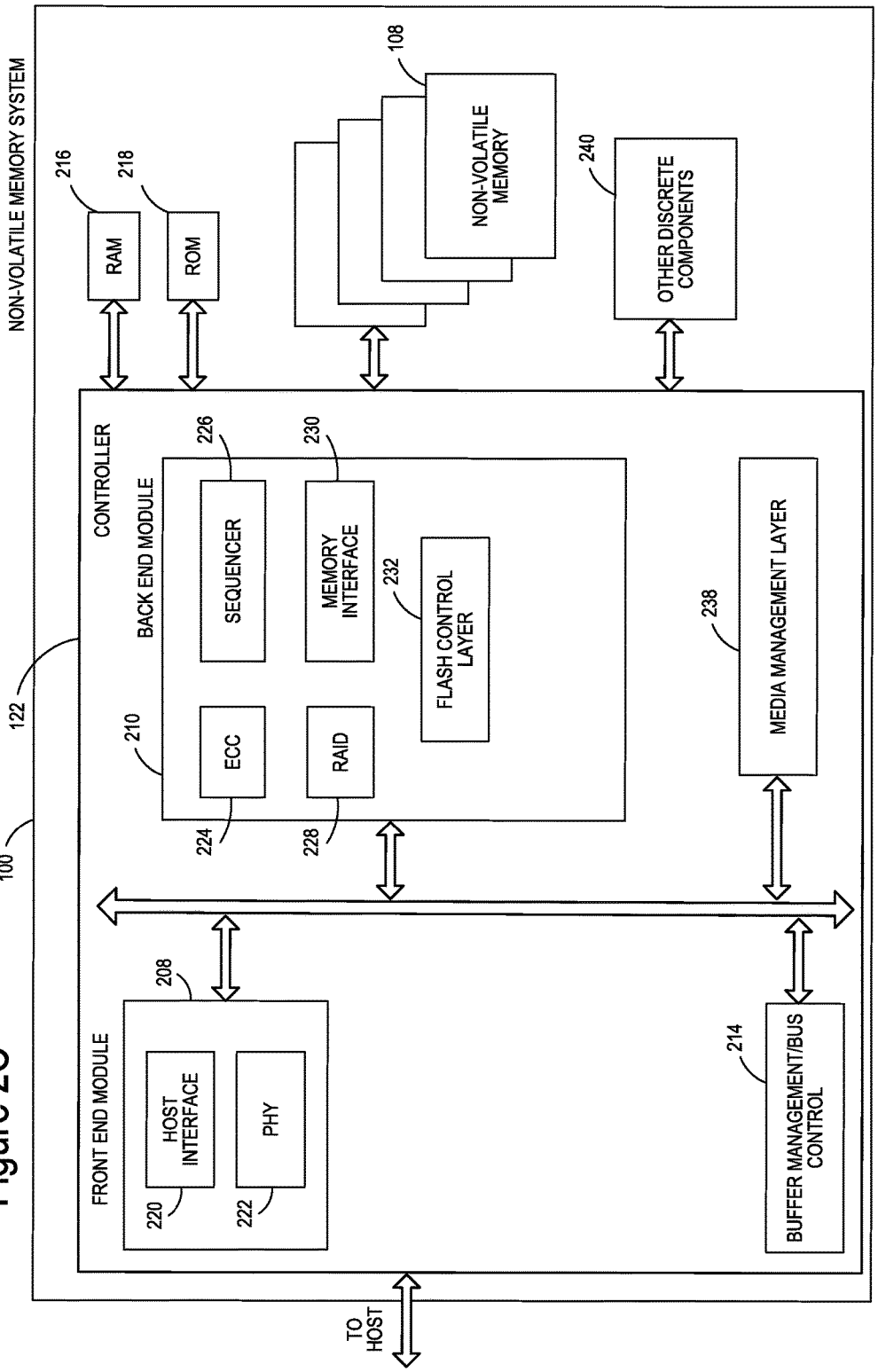
FIG. 2C is a block diagram of example memory system, depicting more details of one embodiment of controller.

FIG. 2C is a functional block diagram of an example memory device such as the 3D stacked non-volatile memory system 100 of FIG. 2A. The components depicted in FIG. 2C are electrical circuits. Memory device 100 includes one or more memory die 108. Each memory die 108 includes a three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, ..., SBp (sensing circuitry) and allow a page of memory cells to be read or programmed in parallel. In some systems, a controller 122 is included in the same memory system 100 (e.g., a removable storage card) as the one or more memory die 108. However, in other systems, the controller can be separated from the memory die 108. In some embodiments controller 122 will be on a different die than memory die 108. In some embodiments, one controller 122 will communicate with multiple memory die 108. In other embodiments, each memory die 108 has its own controller. Commands and data are transferred between the host 140 and controller 122 via a data bus 120, and between controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate. In one embodiment, memory structure 126 implements three dimensional NAND flash memory. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, power control module 116, sense blocks 150, read/write circuits 128, controller 122, processor 122*c*, and/or interface 122*d* can be considered one or more control circuits that performs the functions described herein.

The (on-chip or off-chip) controller 122 (which in one embodiment is an electrical circuit) may comprise one or more processors 122*c*, ROM 122*a*, RAM 122*b*, Memory Interface 122*d*, all of which are interconnected. Other embodiments can use state machines or other custom circuits designed to perform one or more functions. The storage devices (ROM 122*a*, RAM 122*b*) comprises code such as a set of instructions, and the processor 122*c* is operable to execute the set of instructions to provide at least some of the functionality described herein. Alternatively or additionally, processor 122*c* can access code from a storage device in the memory structure, such as a reserved area of memory cells connected to one or more word lines. Memory interface 122*d*, in communication with ROM 122*a*, RAM 122*b* and processor 122*c*, is an electrical circuit (electrical interface) that provides an electrical interface between controller 122 and one or more memory die 108. For example, memory interface 122*d* can change the format or timing of signals, provide a buffer, isolate from surges, latch I/O, etc. Processor 122*c* can issue commands to control circuitry 110 (or any other component of memory die 108) via Memory Interface 122*d*.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

FIG. 2C is a block diagram of example memory system 100, depicting more details of one embodiment of controller 122. In this embodiment, the controller is a flash controller; however, the controller is not limited to being a flash controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host. In other example, memory system 100 can be in the form of a solid state drive (SSD) drive.

In some embodiments, non-volatile memory system 100 includes a single channel between controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2C, controller 122 includes a front end module 208 that interfaces with a host, a back end module 210 that interfaces with the one or more non-volatile memory die 108, and various other modules that perform functions which will now be described in detail.

The components of controller 122 depicted in FIG. 2C may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for controller 122 to perform the functions described herein. The architecture depicted in FIG. 2C is one example implementation that may (or may not) use the components of controller 122 depicted in FIG. 1A or 2B (e.g., RAM, ROM, processor, interface).

Referring again to modules of the controller 122, a buffer manager/bus control 214 manages buffers in random access memory (RAM) 216 and controls the internal bus arbitration of controller 122. A read only memory (ROM) 218 stores system boot code. Although illustrated in FIG. 2C as located separately from the controller 122, in other embodiments one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, Secure Digital (SD), Multimedia Card (MMC), embedded Multimedia Card (eMMC), Universal Flash Storage (UFS), Universal Serial Bus (USB) storage device, Serial Advanced Technology Attachment (SATA) and Small Computer Systems Interface (SCSI) interfaces. The host interface 220 typically facilitates transfer for data, control signals, and timing signals.

Back end module 210 includes an error correction code (ECC) engine 224 that encodes the data bytes received from the host, and decodes and error corrects the data bytes read from the non-volatile memory. A command sequencer 226 generates command sequences, such as read, program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of system 100 illustrated in FIG. 2C include media management layer 238, which performs wear leveling of memory cells of non-volatile memory die 108. System 100 also includes other discrete components 240, such as external electrical interfaces, external RAM, resistors, capacitors, or other components that may interface with controller 122. In alternative embodiments, one or more of the physical layer interface 222, RAID module 228, media management layer 238 and buffer management/bus controller 214 are optional components that are not necessary in the controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory 126 of die 108. The MML 238 may be needed because: 1) the flash memory may have limited endurance; 2) the flash memory 126 may only be written in multiples of ECC pages; and/or 3) the flash memory 126 may not be written unless it is erased as a block. The MML 238 understands these potential limitations of the flash memory 126 which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

Controller 122 may interface with one or more memory dies 108. In one embodiment, controller 122 and multiple memory dies (together comprising non-volatile storage system 100) implement a solid state drive (SSD), which can emulate, replace or be used instead of a hard disk drive inside a host, as a NAS device, laptop, tablet, etc. Additionally, the SSD need not be made to work as a hard drive.

FIG. 3 is a block diagram depicting one embodiment of the sense block SB1 of FIG. 2B. The sense block is partitioned into one or more core portions, referred to as sense modules (e.g., SM0) or sense amplifiers, and a common portion, referred to as a managing circuit (e.g., MC0). In one embodiment, there is a separate sense module for each bit line and one common managing circuit for a set of sense modules, such as SM0, SM1, SM2 and SM3. Each of the sense modules in a group communicates with the associated managing circuit via a data bus 172. Thus, there are one or more managing circuits which communicate with the sense modules of a set of memory cells.

Each sense module SM0, SM1, SM2 and SM3 comprises sense circuitry SC0, SC1, SC2 and SC3, respectively, that performs sensing by determining whether a conduction current in a connected bit line BL0, BL1, BL2 and BL3, respectively, is above or below a predetermined threshold voltage (verify voltage). Each sense module SM0, SM1, SM2 and SM3 also includes a bit line latch BLL0, BLL1, BLL2 and BLL3, respectively, that is used to set a voltage condition on the connected bit line. For example, during a programming operation, a predetermined state latched in a bit line latch will result in the connected bit line being pulled to a lockout state (e.g., 1.5-3 V), a slow programming state (e.g., 0.5-1 V) or a normal programming state (e.g., 0 V).

Managing circuit MC0 comprises a processor 192, four example sets of data latches 194(0), 194(1), 194(2) and 194(3) and an I/O interface 198 coupled between the sets of data latches 194 and the data bus 120. The combination of the Bitline Latches (BLL0-BLL3) and the latches 194 are one embodiment of sense data registers 40. The I/O interface 198 is one embodiment of I/O data registers 42.

In this example, each set of latches is associated with one of the bit lines. For example, data latches 194(0) are associated with bit line BL0, data latches 194(1) are associated with bit line BL1, data latches 194(2) are associated with bit line BL2, and data latches 194(3) are associated with bit line BL3. Each set of data latches includes data latches identified by LDL 151, MDL 152, and UDL 153, in this embodiment. LDL 151 stores a bit for a lower page (LP) of write data, MDL 152 stores a bit for a middle page (MP) of write data, and UDL 153 stores a bit for an upper page (UP) of write data, in a memory which stores three bits of data in each memory cell. Note that there may be one set of such latches associated with each bit line. The latches 194 may also be used to store data read from the non-volatile memory cells.

Additional or fewer data latches per set could be used as well. For example, in a two-bit per memory cell implementation, the MDL data latch for the middle page (MP) of data is not needed. A four-bit per memory cell implementation can use LDL, LMDL (lower-middle page), UMDL (upper-middle page), and UDL latches. The techniques provided herein are meant to encompass such variations. In a further option, another latch is used to identify whether a memory cell is in a slow programming mode when its Vth is within a specified margin of the verify voltage of its target data state.

The processor 192 performs computations during reading and programming. For reading, the processor determines the data state stored in the sensed memory cell and stores the data in the set of data latches. For full programming and refresh programming, the processor reads the latches to determine the data state which is to be written to a memory cell.

During reading, the operation of the system is under the control of the state machine 112 which controls the supply of different control gate voltages to the addressed memory cell. As it steps through the various predefined control gate voltages corresponding to the various memory states supported by the memory, the sense module may trip at one of these voltages and a corresponding output will be provided from the sense module to the processor 192 via the data bus 172. At that point, processor 192 determines the memory state by consideration of the tripping event(s) of the sense module and the information about the applied control gate voltage from the state machine via input lines 193. It then computes a binary encoding for the memory state and stores the resultant data bits into the data latches 194. For example, the memory state for a memory cell associated with bit line BL0 may be stored in latches 194(0), etc. In another embodiment of the managing circuit MC0, the bit line latch serves both as a latch for latching the output of the sense module and also as a bit line latch as described above.

Some implementations can include multiple processors. In one embodiment, each processor will include an output line (not depicted) such that each of the output lines is wired-OR'd together. In some embodiments, the output lines are inverted prior to being connected to the wired-OR line. This configuration enables a quick determination during the program verification process of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with four sense modules, the state machine needs to read the wired-OR line four times, or logic is added to processor 192 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations, the data to be programmed (write data) is stored in the data latches 194 from the data bus 120, in the LP, MP, and UP data latches. For example, the data to be programmed in a selected memory cell associated with bit line BL0 may be stored in latches 194(0), the data to be programmed in a selected memory cell associated with bit line BL1 may be stored in latches 194(1), etc. The programming operation, under the control of the state machine, comprises a series of programming voltage pulses applied to the control gates of the addressed memory cells. Each programming voltage is followed by a read back (verify test) to determine if the memory cell has been programmed to the desired memory state. In some cases, processor monitors the read back memory state relative to the desired memory state. When the two states agree, the processor sets the bit line latch to cause the bit line to be pulled to a state designating program inhibit (e.g., 2-3 V). This inhibits the memory cell coupled to the bit line from further programming even if programming voltages appear on its control gate. In other embodiments, the processor initially loads the bit line latch and the sense circuitry sets it to an inhibit value during the verify process.

Each set of data latches 194 may be implemented as a stack of data latches for each sense module. In some implementations, the data latches are implemented as a shift register so that the parallel data stored therein is converted to serial data for data bus 120, and vice versa. All the data latches corresponding to the read/write block of memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

FIG. 4A depicts an exemplary structure of memory cell array 126. In one embodiment, the array of memory cells is divided into M blocks of memory cells. The block is the unit of erase. That is, each block contains the minimum number of memory cells that are erased together. Each block is typically divided into a number of pages. Note that herein, these pages may be referred to as "ECC pages." An ECC page is a unit of programming. One or more ECC pages of data are typically stored in one row of memory cells. An ECC page can store one or more sectors. A sector includes user data and overhead data. Overhead data typically includes parity bits of an Error Correction Code (ECC) that have been calculated from the user data of the sector. A portion of the controller calculates the ECC parity when data is being programmed into the array, and also checks it when data is being read from the array. Alternatively, the ECCs and/or other overhead data are stored in different ECC pages, or even different blocks, than the user data to which they pertain.

FIG. 4A also shows more details of one embodiment of block i of memory array 126. Block i includes X+1 bit lines and X+1 NAND strings. There may be thousands of NAND strings in a block. Block i also includes 64 data word lines (WL0-WL63), 2 dummy word lines (WL_d0 and WL_d1), a drain side select line (SGD) and a source side select line (SGS). One terminal of each NAND string is connected to a corresponding bit line via a drain select gate (connected to select line SGD), and another terminal is connected to the source line via a source select gate (connected to select line SGS). Because there are sixty four data word lines and two dummy word lines, each NAND string includes sixty four data memory cells and two dummy memory cells. In other embodiments, the NAND strings can have more or fewer than 64 data memory cells and more or fewer dummy memory cells. Data memory cells can store user or system data. Dummy memory cells are typically not used to store user or system data. Some embodiments do not include dummy memory cells.

In some embodiments, programming and reading is performed one word line at a time. That is, only memory cells connected to one word line are programmed or read at one time. Moreover, for efficiency, when programming or reading a word line, all of the memory cells on the word line may be programmed or read. Typically, multiple ECC pages are programmed into or read from the memory cells associated with one word line. The number of ECC pages may depend on how many bits are programmed per memory cell. For example, if one bit is programmed per memory cell, then four, eight, sixteen, or some other number of ECC pages might be programmed or read per word line.

Memory cells may be programmed to store two levels of charge (or some other physical parameter such as resistance) so that a single bit of data is stored in each cell. This is typically referred to as a binary or single level cell (SLC) memory. SLC memory may store two states. Alternatively, the memory cells may be operated to store more than two detectable levels of charge (or some other physical parameter such as resistance), thereby to store more than one bit of data in each. This latter configuration is referred to as multi-level cell (MLC) memory. For example, MLC memory may store four states and can retain two bits of data. As another example, MLC memory may store eight states and can retain three bits of data. Both types of memory cells may be used in a memory, for example binary SLC flash memory may be used for caching data and MLC memory may be used for longer term storage. In some embodiments, the memory system has a pool of blocks used for SLC programming and a pool of blocks used for MLC programmed. These are referred to as SLC block and MLC blocks, respectively. In one embodiment, the memory controller 122 initially stores host data in SLC blocks, and then performs a folding operation in which data is transferred from one or more SLC blocks to an MLC block.

Figure 4B:
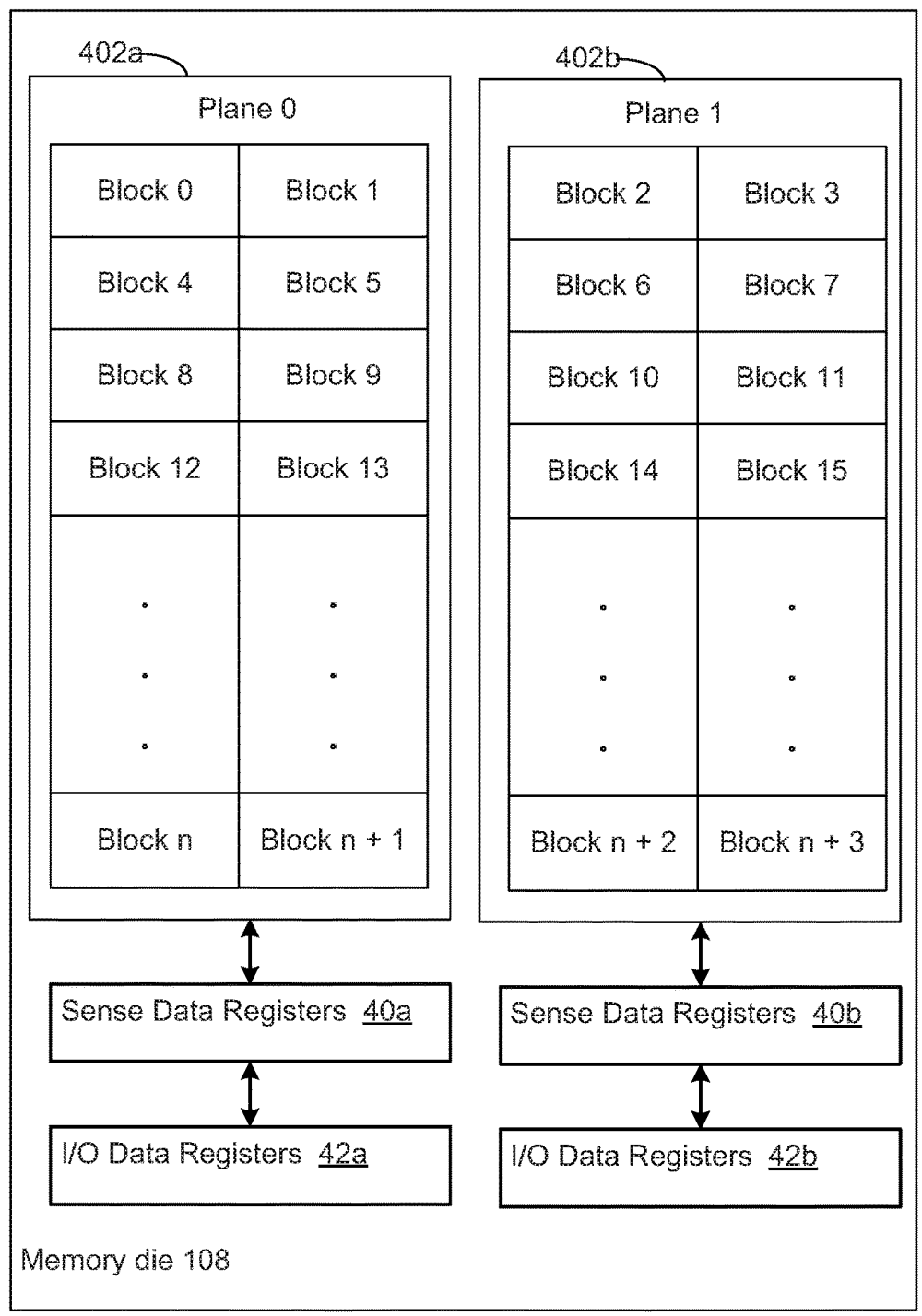
FIG. 4B depicts one example of a memory die having two planes.

To achieve better parallelism, a memory die (or other logical unit) can be divided into multiple planes. A plane may be defined as a unit that is able to report its own operating status and can perform command execution independent of other planes in the memory die. For example, each plane may have its own data registers, data buffers, etc., to enable independent command operation. FIG. 4B depicts one example of a memory die 108 having two planes (Plane 0, 402a; Plane 1, 402b). In this example, Plane 0 has Blocks 0, 1, 4, 5, 8, 9, 12, 13, . . . n, n+1. Plane 1 has Blocks 2, 3, 6, 7, 10, 11, 14, 15, . . . n+2, n+3. This is just one example of how blocks might be addressed for a two plane memory die 108.

Note that Sense Data Registers 40a are able to store data sensed from a group of memory cells in one of the blocks in Plane 0 402a. Likewise, Sense Data Registers 40b are able to store data sensed from a group of memory cells in one of the blocks in Plane 1 402b. Thus, memory cells in one block in Plane 0 may be sensed concurrently with memory cells in one block in Plane 1.

Moreover, data in Sense Data Registers 40a may be used to store data to be programmed into a group of memory cells in one of the blocks in Plane 0 402a. Likewise, data in Sense Data Registers 40b may be used to store data to be programmed into a group of memory cells in one of the blocks in Plane 1 402b. Thus, memory cells in one block in Plane 0 may be programmed concurrently with memory cells in one block in Plane 1. Moreover, there is a separate set of I/O data registers 42a, 42b associated with each plane 402a, 402b.

In one embodiment, the memory die programs one or more ECC pages into a group of memory cells in one of the blocks in Plane 0, while also programming one or more ECC pages into a group of memory cells in one of the blocks in Plane 1. Only one word line in a plane is programmed at one time, in some embodiments. Hence, the memory die programs multiple ECC pages into memory cells on one word line in Plane 0, while also programming multiple ECC pages into memory cells on one word line in Plane 1, in one embodiment.

In one embodiment, the memory die reads one or more ECC pages from a group of memory cells in one of the blocks in Plane 0, while also reading one or more ECC pages from a group of memory cells in one of the blocks in Plane 1. Only one word line in a plane is read at one time, in some embodiments. Hence, the memory die reads multiple ECC pages from memory cells on one word line in Plane 0, while also reading multiple ECC pages from memory cells on one word line in Plane 1, in one embodiment.

Figure 5:
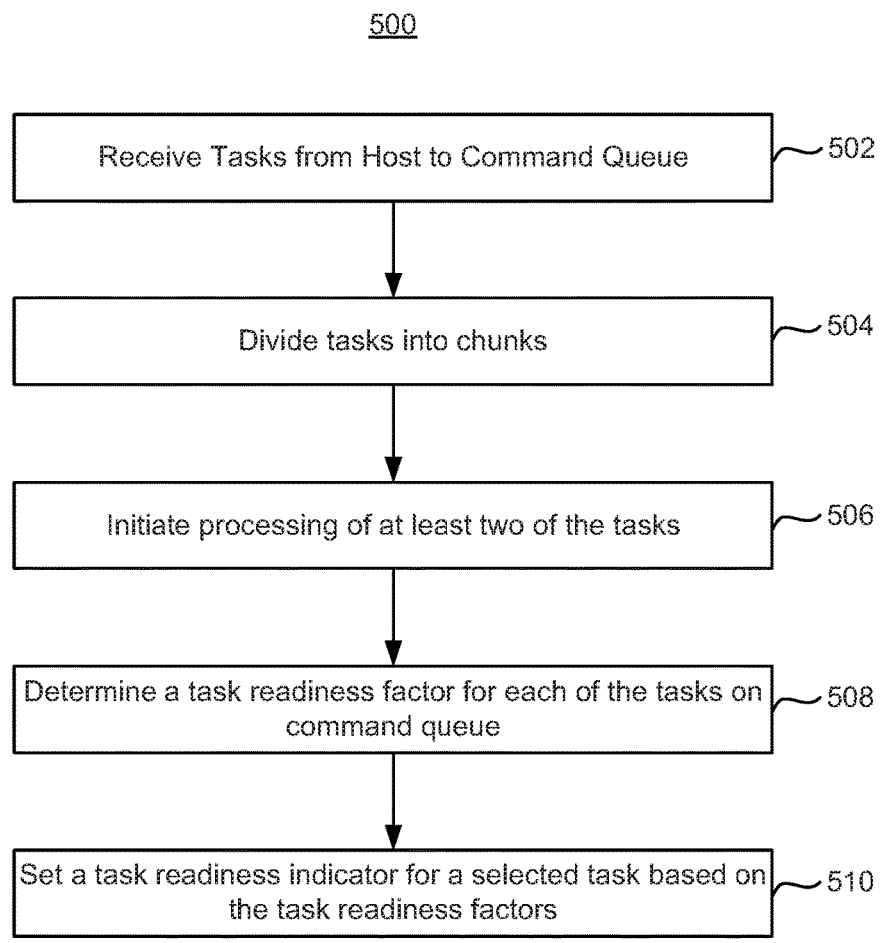
FIG. 5 is a flowchart of one embodiment of a process of setting a task readiness indicator for a selected task.

FIG. 5 is a flowchart of one embodiment of a process 500 of setting a task readiness indicator for a selected task. The process 500 may be performed by the memory controller 122. The process 500 may be performed in a memory system 100 such as those in FIGS. 1A, 2A, 2B, and 2C, but is not limited thereto.

Step 502 includes receiving tasks from a host 140 to a task command queue 32. In one embodiment, the host 140 submits tasks to the memory system 100 as shown and described with respect to FIG. 1E. Thus, step 502 may include the host 140 sending a task set command (e.g., CMD44) and a task address command (e.g., CMD45) for each of the tasks. The memory controller 122 may decode the commands and add information from decoding the commands to a task command register 32(1)-32(n) for that task.

Step 504 includes dividing the tasks into chunks. When processing a task, the memory controller 122 may divide the task into a number of chunks. The memory controller 122 may first determine the physical address(es) that correspond to the logical address(es) in the task, in one embodiment. Then, the memory controller create chunks based on how the memory needs to be accessed to obtain the data at the physical addresses. In one embodiment, each chunk corresponds to a memory access command. However, a single memory access command might be able to access more than one chunk. For example, for a task having a length of 128 kB, the memory controller 122 might divide this into eight 16 kB chunks. The size and number of chunks may depend on the organization of the storage. The size and number of chunks may also depend on how much data for the task is located in a group of memory cells that is typically accessed together. For example, with reference to FIG. 4A, the memory cells on one word line might be able to store 16 kB. Each of the eight chunks might correspond to one word line of data in this example. However, it may be more efficient to form a single memory access command to access that data on multiple word lines. In this case, a chunk may correspond to multiple word lines. Thus, one or more of the chunks might be 32 kB, 48 kB, etc. Note that a chunk does not need to correspond to an entire word line. As another example, with reference to FIG. 4A, the memory cells on one word line might be able to store 16 kB, but there might only be 4 kB of data that is relevant to the task stored in the memory cells on that word line. Hence, the chunk size in this case might be 4 kB. As another example, with reference to FIG. 4B, the group of memory cells that is typically accessed together might be the memory cells on one word line in one block in Plane 0 and the memory cells on one word line in one block of Plane 1. In this case, it might be that the memory cells in Plane 0 contain 2 kB of data relative to the task and the memory cells in Plane 1 contains 2 kB of data relevant to the task. Thus, the chunk for this portion of the task in this example might be 4 kB.

Step 506 includes initiating processing of at least two of the tasks. Initiating processing a chunk refers to initiating a memory access command for that chunk. In one embodiment, step 506 includes the memory controller 122 sending a command to one of the memory die 108 to read data at a physical address. In one embodiment, the memory controller 122 instructs a memory die 108 to read memory cells on a selected word line in a selected block in each of one or more planes on the memory die 108. Step 506 may include initiating data access from the non-volatile memory 126 for at least one chunk for each of at least two tasks. In one embodiment, initiating data access may include the memory controller 122 sending a command to the memory die 108 to access data at a physical location in memory structure 126.

Step 508 includes determining a task readiness factor for the tasks on the command queue. In one embodiment, the memory controller 122 maintains/updates task metadata 38 for the various tasks. The task readiness factor for a task is based on a processing status of the chunks of that task, in one embodiment. The processing status may indicate how far along each chunk of the task is in processing. The processing status could indicate one or more of: 1) whether the memory controller 122 has sent a command to the memory die to read a chunk, whether the memory die has transferred the chunk to the memory controller; and/or 3) whether the memory controller has completed processing of the chunk (e.g., ECC) and the data for this chunk ready to transfers to the host 140. The processing status is not limited to these examples.

The value for the processing status for each chunk is either 0 or 1, in one embodiment. For the sake of example, the processing status may be set to "1" if the chunk has been transferred from the memory die 108 to the memory controller, and "0" if the chunk has not yet been transferred from the memory die 108 to the memory controller. Each chunk in the task is assigned its own value for the processing status, in one embodiment. Note that the value for the processing status is not limited to being either "1" or "0". In some embodiments, the value could be between 0 and 1. Note that the value for the processing status is not limited to two values. For example, the value for the processing status might be one of three or more values. These different values could be assigned based on how far along the chunk is in processing. For example, a value of 0 could be assigned for not yet started, a value between 0 and 1 (non-inclusive) could be assigned if the data has been transferred from the memory die to the memory controller, and a value of 1 could be assigned if the memory controller has finished processing of the data and it is in the data buffer 34 ready to be transferred to the host 140.

The task readiness factor is based on the processing status for all of the chunks in the task, in one embodiment. The task readiness factor is determined by multiplying the value for the processing status for each chunk by its weight, in one embodiment. In one embodiment, the weight decreases for later chunks in the task. The chunks are ordered based on when processing is initiated, in one embodiment. Chunks for which processing has not yet been initiated can be ordered randomly. However, a different technique may be used to order the chunks. In one embodiment, the weight is assigned in any of the ways described in connection with the description of FIG. 1D.

Step 510 includes setting a task readiness indicator for a selected task based on the task readiness factors. Step 510 includes the memory controller 122 comparing the task readiness factor in the task metadata 38 for each task to determine which task has the highest task readiness factor, in one embodiment. This task is selected to have its task readiness indicator set to "task is ready for execution," in one embodiment. In one embodiment, the memory controller 122 sets the status in the task status register 30 accordingly. For example, the status for the selected task may be set to "1". Other tasks that are not yet ready for execution may have their status set to "0." In one embodiment, the memory controller 122 sets a task status register to indicate a task is ready for execution in compliance with the Secure Digital (SD) 6.0 specification; however, the step 510 is not limited to an SD specification.

In one embodiment, the memory controller 122 performs step 510 in response to a request from the host to check the task status. For example, step 510 may be performed in response to a check status command such as step 80 or 88 in FIG. 1E. In one embodiment, the memory controller 122 does not set the task readiness indicator for the selected task until a currently executing task is done executing. In one embodiment, the memory controller 122 may set the task readiness indicator for the selected task while a currently executing task is still executing.

As noted above, step 510 might be triggered in response to the host 140 requesting task status. However, it is not required for the host to send a request for task status in order for the memory controller 122 to perform step 510. Either way, at some point the memory system 100 may provide the task status to the host 140 in response to the check status message. The host sends an execution command after receiving the indication that the task is ready, in one embodiment. For example, the host sends an execute command in step 84 or 92 in FIG. 1E. The memory system 100 executes the task in response to the execution command, in one embodiment. For example, the memory system 100 executes the task in step 86 or 94 in FIG. 1E. Executing the command includes transferring data for a read task from the memory system 100 to the host 140, in one embodiment. Executing the command includes transferring data for a write task from the host 140 to the memory system 100, in one embodiment.

Figure 6:
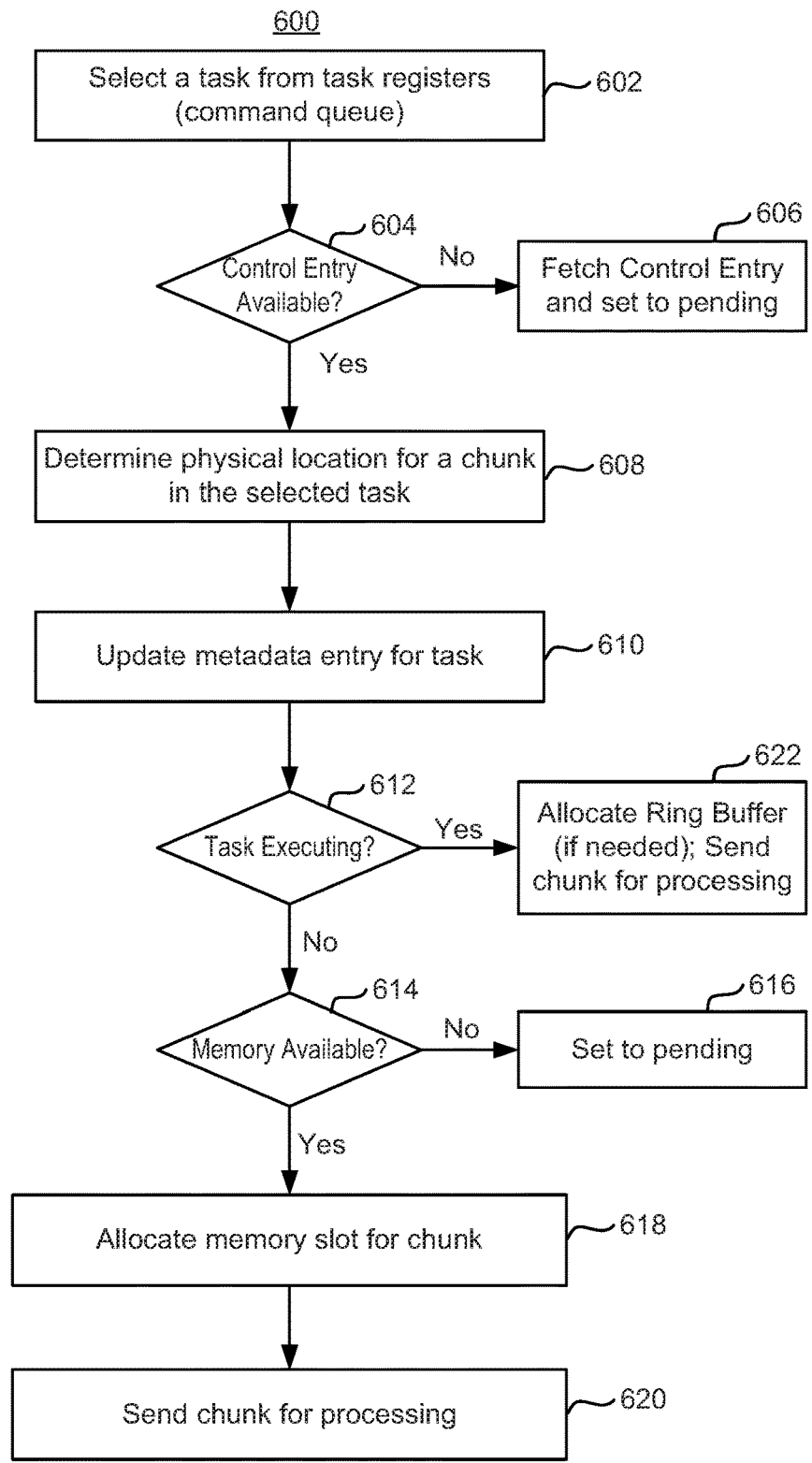
FIG. 6 is a flowchart of one embodiment of a process of selecting a task from the task command queue for initial processing of that task.

FIG. 6 is a flowchart of one embodiment of a process 600 of selecting a task from the task command queue 32 (also referred to as command queue) for initial processing of that task. The task is selected from one of the task registers 32(1)-32(n), in one embodiment. Note the selecting a task for processing does not refer to selecting a task for execution. Rather, the processing refers to initiating operations within the memory system 100 for a chunk of the task. For example, the memory controller 122 may send a command to a memory die 108 to access data for one of the chunks of the selected task. Process 600 may also perform management functions such as allocating memory (in, for example, data buffer 34) to one or more chunks of a selected task. Note that the task that is selected for processing in process 600 might or might not already be executing. For example, it is possible that some of the data for the task has already been transferred to the host 140. The process 600 may be performed by the memory controller 122. The process 600 may be performed in a memory system 100 such as those in FIG. 1A, 2A, 2B, 2C, but is not limited thereto.

Step 602 includes selecting a task from the one of the task registers 32(1)-32(n). The memory controller 122 is not constrained to select the tasks in the order they were provided by the host 140. Thus, the memory controller is not constrained to select the tasks in the order they were placed on the task command queue 32. In one embodiment, each task is assigned a priority. This priority may be initially assigned by the host 140, and may be modified by the memory controller 122. The memory controller 122 factors in the priority in the task selection, in one embodiment. With reference to FIG. 1B, the controller 122 selects a task from one of the task registers 32(1)-32(n), in one embodiment.

As will be described below, the task may have a status of pending or executing, in one embodiment. Tasks that have a status of pending may be pushed back on the task command queue 32 such that other tasks may be selected ahead of one that is pending. A task that has a status of executing may be given a higher priority to favor its selection. However, some tasks might linger on the task command queue 32. If this happens, the memory controller 122 may increase the priority of such a task that has been on the task command queue 32 for some pre-determined amount of time. In one embodiment, a task may have a status of processing. This is for a task for which processing of a chunk has been initiated, but the task is not yet executing. In one embodiment, a task that is processing may be given a higher priority such that other chunks can be sent for processing ahead of tasks for which processing has not yet started.

Step 604 includes a determination of whether there is a control entry for the selected task. For example, the memory controller 122 determines whether it is able to perform a logical address to physical address translation based on information in L2P cache 36. Note that a task command register 32(1)-32(n) may contain information such as the starting logical address for this task, as well as a data length. Thus, the memory controller 122 determines whether the L2P cache 36 contains the necessary information to translate from the logical address(es) to physical address(es), in one embodiment. Note that the memory controller 122 may need to translate more than one logical address, based on the length of the data for this task.

If the controller 122 does not have the control entry, the controller 122 fetches the control entry from non-volatile memory 126, in step 606. For example, the controller 122 sends a request to a memory die 108 for one or more entries in L2P table 66. Note that since it may take a small amount of time for the entry to be returned from memory die 108, the memory controller 122 may temporarily stop processing this task, and return to step 602 to select another task. Prior to selecting another task, the controller 122 may set the status for this task to pending. In one embodiment, the memory controller 122 sets the status to pending in the task command register 32(1)-32(n) for this task. In one embodiment, once the control entry is provided to the memory controller 122, the status of pending is removed. Thus, the pending status could be changed prior to this task being selected again. However, it is not required to change the pending status when the control entry is provided to the memory controller 122. Thus, the task could be selected at a later point with its status still set to pending, in one embodiment.

If the controller 122 has the control entry for this task (step 604=yes), then control passes to step 608. For example, if the L2P cache 36 has the necessary information to perform a logical address to physical address translation, control passes to step 608.

Step 608 includes determining a physical location for one or more chunks of the task. In some embodiments, the memory controller divides a task into one or more chunks. In one embodiment, the memory controller forms a memory access command to obtain a chunk. This is referred to herein as "creating a chunk." The size of the chunk could vary from one task to the next, and even within a task. The size of the chunk may depend on where the data is located in non-volatile memory 126. In one embodiment, a chunk might be as small as one ECC page. In one embodiment, a chunk might correspond to one or more word lines of memory cells. The actual amount of data will depend on the number of bits stored per memory cell.

Step 610 includes updating the metadata 38 for this task. If this is the first time that the task has been selected then a new metadata entry may be created. The task ID and total task length are added to the task metadata. Also, the total number of chunks created is added to or updated.

Step 612 includes a determination of whether this task is already executing. The controller 122 may check the task status register 30 to make this determination. If the task is not yet executing, then control passes to step 614. Step 614 is a determination of whether the memory controller has memory available to store data for this chunk. For example, the memory controller 122 determines whether the data buffer 34 has sufficient space for this chunk. If sufficient memory is not available, then the processing of this task concludes for the time being. Also, the status is set to pending in step 616. Setting the status to pending has been described with respect to step 606. The memory controller 122 may then select another task from the task registers (return to step 602).

Figure 8:
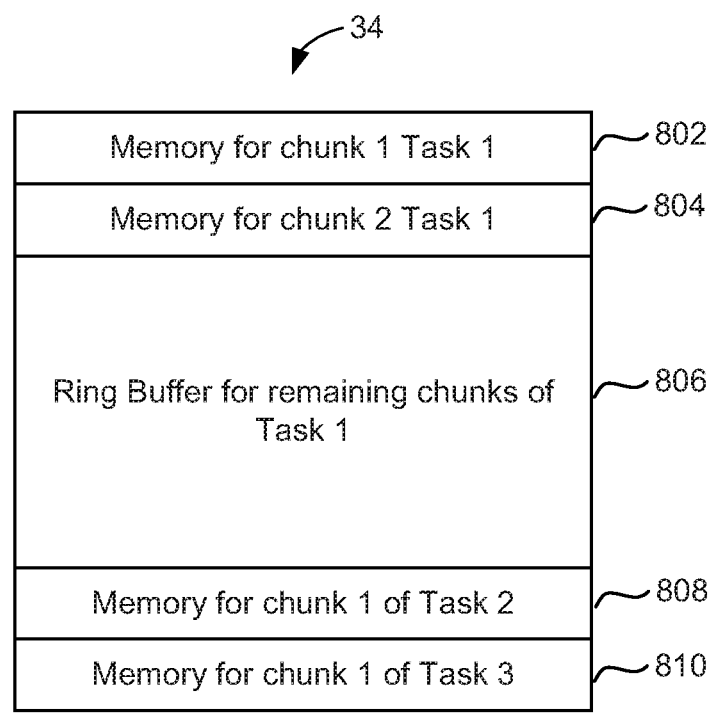
FIG. 8 depicts a data buffer that has various regions allocated for chunks of tasks, in accordance with one embodiment.

If there is memory available, then control passes to step 618. In step 618, the memory controller 122 allocates memory for this chunk. For example, the memory controller allocates a region in the data buffer 34 for this chunk. With reference to FIG. 8, region 802 is assigned to chunk 1 of Task 1, as one example. Note that region 802 is a dedicated memory slot for chunk 1 of Task 1. FIG. 8 will be discussed in more detail below.

Figure 7:
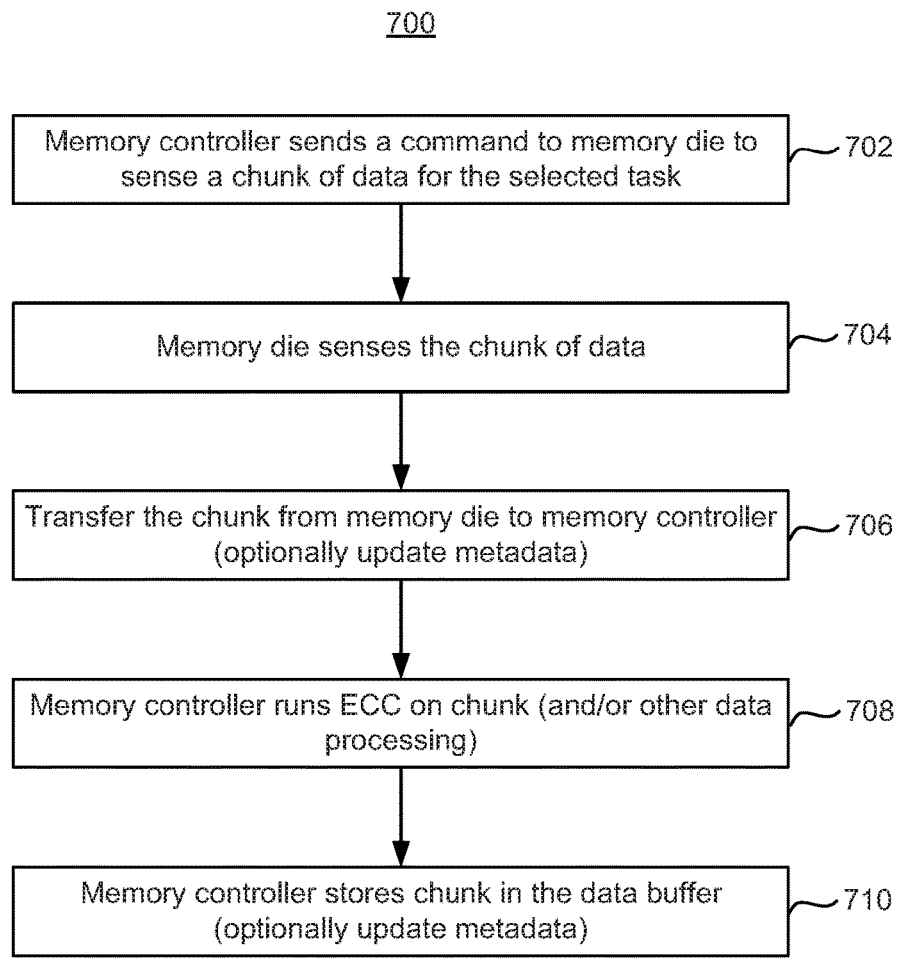
FIG. 7 is a flowchart of one embodiment of a process of sending a chunk of a task for processing.

Step 620 includes the memory controller 122 sending this chunk for processing. Step 620 may include sending a command for this chunk to a memory command queue. The memory command queue is distinct from the task command queue 32. The memory commands could be ONFI commands, as one example. In one embodiment, sequencer 226 determines when to send commands from the memory queue to a memory die 108. The memory queue could be a FIFO queue. In one embodiment, the sequencer 226 is allowed to select the order in which the memory commands are sent to the memory dies 108. Note that it is not required for there to be a memory queue. Thus, step 620 could include the memory controller sending the memory command to a memory die 108 to access data for this chunk. FIG. 7 depicts further details of one embodiment of sending the chunk for processing. In one embodiment, the status for this chunk is set to processing.

Returning again to the discussion of step 612, in the event that the task was executing (step 612=yes), then control passes to step 622. Step 622 includes allocating a ring buffer for the remaining chunks in this task, if a ring buffer has not already been allocated. FIG. 8 shows one embodiment of a data buffer 34 having a ring buffer 806. Assume that step 618 was performed to allocate region 804 for chunk 2 of Task 1. Now assume, the when chunk 3 of Task 1 was being processed, it was determined in step 612 that Task 1 is executing. In this case, the memory controller 122 may allocate the ring buffer 806 to chunk 3 and any other remaining chunks of Task 1, in step 622. Also, this chunk is sent for processing, as in step 620. FIG. 8 will be described in further detail below.

FIG. 7 is a flowchart of one embodiment of a process 700 of sending a chunk of a task for processing. The process 700 may be initiated by step 620 of process 600. The process 700 may be initiated by step 622 of process 600. The process 700 may be performed by the memory controller 122. The process 700 may be performed in a memory system 100 such as those in FIG. 1A, 2A, 2B, 2C, but is not limited thereto. The process 700 is described in terms of one memory die 108 processing the request for the chunk of data. The process 700 is an embodiment in which one memory command is used to sense one chunk. However, depending on how chunk sizes are defined, it is not required that one memory command senses one chunk. For example, one memory command might be used to sense multiple chunks.

Step 702 includes the memory controller 122 sending a command to a memory die 108 to sense a chunk of data for the selected task. The command might request the memory die 108 to sense memory cells one or more word lines. The memory cells could be in one plane or in more than one plane. The memory controller 122 determined the physical location for the chunk(s) in step 608 of process 600. Optionally, the metadata for this task is updated. For example, the processing status may be updated for this chunk.

Step 704 includes the memory die 108 sensing the chunk of data. The memory die 108 may use sense blocks such as the one depicted in FIG. 3. The sensed data may be stored in sense data registers 40, and then transferred to I/O data registers 42. Memory cells in one or more planes of the memory die 108 may be sensed. The size of the data that is sensed could exceed the chunk size. For example, it might be that only one ECC page is needed from each of two planes on the memory die 108. This might total 4 kB. However, the memory die 108 might sense 32 kB as a default unit of sensing. As noted, in one embodiment, if multiple word lines are sensed, this data could be defined as one chunk. However, the definition of a chunk size is not so limited. In another embodiment, the chunk size is defined such that one memory command could sense multiple chunks. For example, each chunk could correspond to one word line of memory cells.

Step 706 includes transferring the chunk from the memory die 108 to the memory controller 122. The data may be transferred from I/O data registers 42 to data buffer 34, as one possibility. However, note that this data may be raw (or uncorrected) data for which the memory controller 122 has not yet run an ECC algorithm. Optionally, the metadata 38 for this task is updated. For example, the processing status may be updated for this chunk. As one example, the processing status for this chunk is changed from "0" to "1" to indicate that this chunk has been transferred to the memory die 108. Note that there are many ways to indicate the processing status. The value for the processing status is not required to be either "1" or "0."

Step 708 includes the memory controller 122 performing error correction and/or other processing of the chunk. In one embodiment, ECC engine 224 is used to run an ECC algorithm. Optionally, the metadata 38 for this task is updated upon successfully running the ECC algorithm.

Step 710 includes the memory controller 122 storing the processed chunk of data into the data buffer 34. At this point, the data for this chunk is ready to be transferred to the host 140. Optionally, the metadata for this task is updated. For example, the processing status may be updated for this chunk. As one example, the processing status is changed from "0" to "1" to indicate that the processed data for this chunk has been transferred to the data buffer 34.

Note that some specifications, such as the SD specification 6.0 have a requirement that when a task is executing the task needs to be completed and cannot be suspended to perform another task. One embodiment of the memory controller 122 uses a portion of the volatile memory 122b as a ring buffer that is dedicated to chunks of an executing task. This ring buffer may assure that there will always be memory for the chunks of the task. Thus, even if data is being fetched from non-volatile memory 126 for other tasks, the ring buffer may assure that the executing task does not stall due to a lack of memory in data buffer 34.

FIG. 8 depicts a portion of a data buffer 34 that has various regions allocated for chunks of tasks, in accordance with one embodiment. Memory slot 802 was allocated to chunk 1 of Task 1, and memory slot 804 was allocated to Task 1. These are referred to herein as dedicated memory slots in that they are only for this particular chunk. These memory slots may have been allocated during one embodiment of step 618 of process 600. Note that step 618 is performed when a task is not yet executing. However, note that step 622 is performed when a task is executing. In step 622 a ring buffer is allocated for the remaining chunks in the task. Referring to FIG. 8, ring buffer 806 is allocated to the remaining chunks of Task 1. The ring buffer is not necessarily large enough for all of the remaining chunks at once. However, as one chunk is transferred from the ring buffer 806 to the host 140 that portion of the ring buffer may be allocated to another chunk. Thus, the remaining chunks may share the ring buffer 806. Moreover, no other task may be allocated space in the ring buffer 806 until the task is done executing. Hence, processing of the various chunks may proceed without running out of memory.

Finally, note that region 808 has been allocated to chunk 1 of task 2. Also, region 810 has been allocated to chunk 1 of Task 3. These allocations may have occurred in different iterations of step 618 of process 600. Thus, note that processing of chunk 1 of Task 2 (as well as chunk 1 of Task 3) can proceed even while Task 1 is executing. Hence, when Task 1 completes Task 2 and/or 3 may be ready for execution. The memory controller 122 may select which of Tasks 2 or 3 has the highest readiness factor.

The following example will be used to illustrate memory allocation for a task having a length of 128 kB. The task is divided into eight 16 kB chunks, for example. When chunks 1 and 2 are processed in process 600, step 618 is performed to allocate region 802 to chunk 1 and region 804 to chunk 2. When chunk 3 is being processed, step 622 is performed to allocate a 32 kB ring buffer 806 to chunk 3 and the remaining chunks. Note that chunk 3 and the other remaining chunks total 96 kB. As data from the ring buffer 806 is transferred to the host 140, other data may be added. Note that this transfer need not be for a full chunk. For example, the memory device 100 might transfer 4 kB from the ring buffer 806 at a time to the host 140. As soon as the 4 kB is transferred to the host 140, other data for the task may be added to the ring buffer 806. Hence, the task does not run out of memory when executing. Also, other regions of the data buffer 34 may be dedicated to chunks for other tasks. Hence, these chunks can process "in the background". Therefore, other tasks can be ready to execute as soon as the task using the ring buffer 806 is done executing.

A first embodiment disclosed herein is an apparatus comprising: non-volatile memory; a task command queue; a task status register; a data buffer; an interface configured to receive tasks from a host to access the non-volatile memory; and one or more control circuits in communication with the non-volatile memory, the task command queue, the task status register, the data buffer, and the interface. The one or more control circuits are configured to add, to the task command queue, a plurality of tasks from the host to access the non-volatile memory. The one or more control circuits are configured to divide the tasks into one or more chunks. The one or more control circuits are configured to initiate processing of at least two of the tasks, including initiate data access from the non-volatile memory for at least one chunk for each of the at least two tasks. The one or more control circuits are configured to determine a task readiness factor for respective tasks based on how far chunks in the respective task have progressed in the processing. The one or more control circuits are configured to set a task ready indicator in the task status register for a selected task based on the task readiness factor of the ones of the plurality of tasks.

In a second embodiment, in furtherance of the first embodiment, the one or more control circuits are further configured to determine the task readiness factor for respective tasks based on how far chunks in the respective task have progressed in the processing and how much data is required for the respective task.

In a third embodiment, in furtherance of the first or second embodiments, the one or more control circuits are further configured to assign a maximum value for the task readiness factor for tasks having a single chunk in response to the single chunk completing a certain stage in the processing of the single chunk.

In a fourth embodiment, in furtherance any of the first to third embodiments, the one or more control circuits are further configured to assign a value for the task readiness factor for respective tasks based on whether a chunk of the respective task has been stored in the data buffer for transfer to the host.

In a fifth embodiment, in furtherance of any of the first to fourth embodiments, the one or more control circuits are further configured to assign a value for the task readiness factor for respective tasks based on whether a chunk of the respective task has been sensed from the non-volatile memory.

In a sixth embodiment, in furtherance of any of the first to fifth embodiments, the one or more control circuits are further configured to: execute the selected task in response to a execute command from the host; and after the selected task is executing, allocate a ring buffer in the data buffer to chunks in the selected task for which processing has not yet begun.

In a seventh embodiment, in furtherance of any of the first to sixth embodiments, the one or more control circuits are further configured to prior to the selected task starting execution, allocate a dedicated memory slot in the data buffer to a chunk of the selected task for which processing has not yet begun.

In an eighth embodiment, in furtherance of any of the first to seventh embodiments, the one or more control circuits are further configured to: allocate a dedicated memory slot in the data buffer to a chunk of a task for which processing has not yet begun at a time when the selected task is executing.

In a ninth embodiment, in furtherance of any of the first to eighth embodiments, the one or more control circuits are further configured to complete execution of the selected task in response to an execute command from the host without starting execution of another task.

One embodiment includes a method of operating a memory system. The method comprises: placing a plurality of tasks from a host to access non-volatile memory on a memory die in the memory system onto a task command queue; dividing each of the tasks into one or more chunks; initiating access of one or more chunks for at least two of the tasks from the non-volatile memory, including sending a command to the memory die to access data for at least one chunk for each of the at least two tasks; determining a task readiness factor for each of the plurality of tasks based on how far accessing of respective chunks has progressed from initiating access of the respective chunk to having the data for the respective chunk in a data buffer ready to transfer to the host; setting a task readiness indicator for a selected task in a task status register based on the task readiness factor of each of the plurality of tasks; and providing data for the selected task from the data buffer to the host in response to an execute command from the host.

One embodiment includes a non-volatile memory system, comprising: a memory die having non-volatile memory; command processing means for: i) placing a plurality of tasks from a host to access the non-volatile memory onto a task command queue; and ii) dividing each of the tasks into one or more chunks. The non-volatile memory system further includes command sequencing means for initiating access of one or more chunks for at least two of the tasks from the non-volatile memory, including means for sending a command to the memory die to access data for at least one chunk for each of the at least two tasks. The non-volatile memory system further includes task metadata means for determining a task readiness factor for each of the plurality of tasks based on how far accessing of respective chunks has progressed from initiating access of the respective chunk to having the data for the respective chunk in a data buffer ready to transfer to the host. The non-volatile memory system further includes task status register setting means setting a task readiness indicator for a selected task in a task status register based on the task readiness factor of each of the plurality of tasks. The non-volatile memory system further includes task execution means for providing data for the selected task from the data buffer to the host in response to a execute command from the host.

In one embodiment the command processing means comprises one or more of processor 122c, controller 122, RAM 122b, task command queue 32, front end module 28, host interface 220, PHY 222, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the command processing means may include software stored in a processor readable device (e.g., memory) to program a processor to perform command processing.

In one embodiment the command sequencing means comprises one or more of processor 122c, controller 122, RAM 122b, sequencer 226, memory interface 230, flash control layer 232, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the task metadata means may include software stored in a processor readable device (e.g., memory) for determining a task readiness factor for each of the plurality of tasks based on how far accessing of respective chunks has progressed from initiating access of the respective chunk to having the data for the respective chunk in a data buffer ready to transfer to the host.

In one embodiment the task metadata means comprises one or more of processor 122c, controller 122, RAM 122b, task metadata 38, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the task metadata means may include software stored in a processor readable device (e.g., memory) for determining a task readiness factor for each of the plurality of tasks based on how far accessing of respective chunks has progressed from initiating access of the respective chunk to having the data for the respective chunk in a data buffer ready to transfer to the host.

In one embodiment the task status register setting means comprises one or more of processor 122c, controller 122, RAM 122b, task metadata 38, task status register 30, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the task status register setting means may include software stored in a processor readable device (e.g., memory) for setting a task readiness indicator for a selected task in a task status register based on the task readiness factor of each of the plurality of tasks.

In one embodiment the task execution means comprises one or more of processor 122c, controller 122, RAM 122b, state machine 112, on-chip address decoder 114, power control 116, read/write circuits 128, sense blocks, decoders 124/132, an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the task execution means may include software stored in a processor readable device (e.g., memory) for providing data for the selected task from the data buffer to the host in response to a execute command from the host.

For the purpose of this document, the terms "write" and "store" are often used interchangeably, as are the terms "writing" and "storing."

For the purpose of this document, the numeric terms first (i.e., 1st) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it. For example, previous write commands may have been received before a $1^{st}$ write command was received. However, it may be implied that a $2^{nd}$ write command is received at a later point in time than when a $1^{st}$ write command was received, as there terms are being used herein. Similarly, it can be implied that the a $3^{rd}$ write command was received after the $2^{nd}$ write command.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments, but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
 non-volatile memory;
 a task command queue;
 a task status register;
 a data buffer;
 an interface configured to receive tasks from a host to access the non-volatile memory; and
 one or more control circuits in communication with the non-volatile memory, the task command queue, the task status register, the data buffer, and the interface, the one or more control circuits configured to:
  add, to the task command queue, a plurality of tasks from the host to access the non-volatile memory;
  divide the tasks into one or more chunks;
  initiate processing of at least two of the tasks, including initiate data access from the non-volatile memory for at least one chunk for each of the at least two tasks;
  determine a task readiness factor for respective tasks based on how far chunks in the respective task have progressed in the processing; and
  set a task ready indicator in the task status register for a selected task based on the task readiness factor of the respective tasks.

2. The apparatus of claim 1, wherein the one or more control circuits are further configured to:
 determine the task readiness factor for respective tasks based on how far chunks in the respective task have progressed in the processing and how much data is required for the respective task.

3. The apparatus of claim 1, wherein the one or more control circuits are further configured to:

assign a maximum value for the task readiness factor for tasks having a single chunk in response to the single chunk completing a certain stage in the processing of the single chunk.

4. The apparatus of claim 1, wherein the one or more control circuits are further configured to:
assign a value for the task readiness factor for respective tasks based on whether a chunk of the respective task has been stored in the data buffer for transfer to the host.

5. The apparatus of claim 1, wherein the one or more control circuits are further configured to:
assign a value for the task readiness factor for respective tasks based on whether a chunk of the respective task has been sensed from the non-volatile memory.

6. The apparatus of claim 1, wherein the one or more control circuits are further configured to:
execute the selected task in response to an execute command from the host; and
after the selected task is executing, allocate a ring buffer in the data buffer to chunks in the selected task for which processing has not yet begun.

7. The apparatus of claim 6, wherein the one or more control circuits are further configured to:
prior to the selected task starting execution, allocate a dedicated memory slot in the data buffer to a chunk of the selected task for which processing has not yet begun.

8. The apparatus of claim 6, wherein the one or more control circuits are further configured to:
allocate a dedicated memory slot in the data buffer to a chunk of a task for which processing has not yet begun at a time when the selected task is executing.

9. The apparatus of claim 1, wherein the one or more control circuits are further configured to:
complete execution of the selected task in response to an execute command from the host without starting execution of another task.

10. A non-volatile memory system, comprising:
a memory die having non-volatile memory;
command processing means for:
 i) placing a plurality of tasks from a host to access the non-volatile memory onto a task command queue; and
 ii) dividing each of the tasks into one or more chunks;
command sequencing means for initiating access of one or more chunks for at least two of the tasks from the non-volatile memory, including means for sending a command to the memory die to access data for at least one chunk for each of the at least two tasks;
task metadata means for determining a task readiness factor for each of the plurality of tasks based on how far accessing of respective chunks has progressed from initiating access of the respective chunk to having the data for the respective chunk in a data buffer ready to transfer to the host;
task status register setting means setting a task readiness indicator for a selected task in a task status register based on the task readiness factor of each of the plurality of tasks; and
task execution means for providing data for the selected task from the data buffer to the host in response to a execute command from the host.

11. The non-volatile memory system of claim 10, wherein the task metadata means is further for assigning a maximum task readiness for tasks having a single chunk in response to access of the single chunk from the non-volatile memory reaching a pre-determined stage between sending a command to the non-volatile memory to access the single chunk and having the data for the single chunk in the data buffer ready to transfer to the host.

12. The non-volatile memory system of claim 10, further comprising memory allocation means for:
prior to executing the selected task, allocating a dedicated memory slot in the data buffer to chunks of the selected task upon initiating access of the chunks from the non-volatile memory; and
after the selected task is executing, allocating a ring buffer in the data buffer to chunks in the selected task for which memory has not yet been allocated.

13. The non-volatile memory system of claim 10, wherein the task metadata means is further for:
 i) assigning a processing value to each of the chunks in a respective task based on whether the respective chunk has reached a pre-determined stage between initiating access of the respective chunk to having the data for the respective chunk in a data buffer ready to transfer to the host; and
 ii) applying decreasing weights to chunks later in the respective.

14. A method of operating a memory system, the method comprising:
placing a plurality of tasks from a host to access non-volatile memory on a memory die in the memory system onto a task command queue;
dividing each of the tasks into one or more chunks;
initiating access of one or more chunks for at least two of the tasks from the non-volatile memory, including sending a command to the memory die to access data for at least one chunk for each of the at least two tasks;
determining a task readiness factor for each of the plurality of tasks based on how far accessing of respective chunks has progressed from initiating access of the respective chunk to having the data for the respective chunk in a data buffer ready to transfer to the host;
setting a task readiness indicator for a selected task in a task status register based on the task readiness factor of each of the plurality of tasks; and
providing data for the selected task from the data buffer to the host in response to an execute command from the host.

15. The method of claim 14, wherein determining a task readiness factor for each of the plurality of tasks comprises:
assigning a maximum task readiness for tasks having a single chunk in response to access of the single chunk from the non-volatile memory reaching a pre-determined stage between sending a command to the memory die to access the single chunk and having the data for the single chunk in the data buffer ready to transfer to the host.

16. The method of claim 14, wherein determining a task readiness factor for each of the plurality of tasks comprises:
assigning a value for the task readiness factor for tasks based on whether a chunk of the respective task has been stored in the data buffer for transfer to the host.

17. The method of claim 14, wherein determining a task readiness factor for each of the plurality of tasks comprises:
assign a value for the task readiness factor for tasks based on whether a chunk of the respective task has been transferred from the memory die to a memory controller.

18. The method of claim 14, wherein determining a task readiness factor for each of the plurality of tasks comprises:

assigning decreasing weights to chunks of a task based on an order in which access of the chunks was initiated.

19. The method of claim 14, further comprising:

prior to executing the selected task, allocating a dedicated memory slot in the data buffer to chunks of the selected task upon initiating access of the chunks from the non-volatile memory;

executing the selected task in response to an execute command from the host; and after the selected task is executing, allocating a ring buffer in the data buffer to be shared by chunks in the selected task for which memory has not yet been allocated.

20. The method of claim 14, further comprising:

providing all of the data for the selected task to the host prior to starting to provide any data for any other task to the host.

* * * * *